(12) United States Patent
Stockdale et al.

(10) Patent No.: US 8,162,737 B2
(45) Date of Patent: Apr. 24, 2012

(54) CONTACTLESS PLAYER CARD WITH IMPROVED SECURITY

(75) Inventors: James W. Stockdale, Clio, CA (US); Chauncey W. Griswold, Reno, NV (US); Harold E. Mattice, Gardnerville, NV (US); Richard L. Wilder, Sparks, NV (US); Christian E. Gadda, Las Vegas, NV (US)

(73) Assignee: IGT, Reno, NV (US)

( * ) Notice: Subject to any disclaimer, the term of this patent is extended or adjusted under 35 U.S.C. 154(b) by 421 days.

(21) Appl. No.: 12/473,186

(22) Filed: May 27, 2009

(65) Prior Publication Data
US 2010/0304819 A1    Dec. 2, 2010

(51) Int. Cl.
*G06F 19/00* (2011.01)
(52) U.S. Cl. ........................................... 463/16
(58) Field of Classification Search ............... 463/16–21
See application file for complete search history.

(56) References Cited

U.S. PATENT DOCUMENTS

| | | |
|---|---|---|
| 4,359,633 A | 11/1982 | Bianco |
| 5,129,652 A | 7/1992 | Wilkinson |
| 5,265,874 A | 11/1993 | Dickinson et al. |
| 5,290,033 A | 3/1994 | Bittner et al. |
| 5,586,936 A | 12/1996 | Bennett et al. |
| 5,643,086 A | 7/1997 | Alcorn et al. |
| 5,702,304 A | 12/1997 | Acres et al. |
| 5,741,183 A | 4/1998 | Acres et al. |
| 5,761,647 A | 6/1998 | Boushy |
| 5,816,918 A | 10/1998 | Kelly et al. |
| 5,833,540 A | 11/1998 | Miodunski et al. |
| 5,951,397 A | 9/1999 | Dickinson |
| 5,952,922 A | 9/1999 | Shober |
| 5,988,501 A | 11/1999 | Murakami et al. |
| 6,003,013 A | 12/1999 | Boushy et al. |
| 6,048,269 A | 4/2000 | Burns et al. |

(Continued)

FOREIGN PATENT DOCUMENTS

DE    19855117 A1    5/2000

(Continued)

OTHER PUBLICATIONS

Foreign Search Report dated Jul. 7, 2005, from corresponding UK Application No. 0502535.8; 2 pgs.

(Continued)

*Primary Examiner* — William D Coleman
*Assistant Examiner* — Daniel Shook
(74) *Attorney, Agent, or Firm* — Weaver Austin Villeneuve & Sampson LLP

(57) ABSTRACT

A gaming system that is compatible with photonic-powered card devices is described. The gaming system may comprise a number of host devices each coupled to one or more gaming machines. The gaming machines may be operable to provide wagering on an outcome of a game of chance, display the outcome of the game of chance, accept cash or an indicia of credit and dispense an award, such as cash or indicia of credit, to a player utilizing the gaming machine. The gaming machines may be configured to accommodate a photonic-powered card including communicating with these cards via an optical communication interface. One or more transactions on the gaming machine, such as a transfer of cash or indicia of credit on or off the gaming machine or an initiation of a player tracking session, may be enabled using photonic-powered card devices and associated hardware/software.

33 Claims, 10 Drawing Sheets

U.S. PATENT DOCUMENTS

| | | |
|---|---|---|
| 6,089,975 A | 7/2000 | Dunn |
| 6,104,815 A | 8/2000 | Alcorn et al. |
| 6,106,396 A | 8/2000 | Alcorn et al. |
| 6,113,495 A | 9/2000 | Walker et al. |
| 6,135,884 A | 10/2000 | Hedrick et al. |
| 6,142,876 A | 11/2000 | Cumbers |
| 6,149,522 A | 11/2000 | Alcorn et al. |
| 6,161,743 A | 12/2000 | Shoemaker, Jr. |
| 6,162,122 A | 12/2000 | Acres et al. |
| 6,183,362 B1 | 2/2001 | Boushy |
| 6,193,156 B1 | 2/2001 | Han et al. |
| 6,193,608 B1 | 2/2001 | Walker et al. |
| 6,210,279 B1 | 4/2001 | Dickinson |
| 6,234,900 B1 | 5/2001 | Cumbers |
| 6,244,958 B1 | 6/2001 | Acres |
| 6,265,977 B1 | 7/2001 | Vega et al. |
| 6,267,671 B1 | 7/2001 | Hogan |
| 6,280,326 B1 | 8/2001 | Saunders |
| 6,285,295 B1 | 9/2001 | Casden |
| 6,293,866 B1 | 9/2001 | Walker et al. |
| 6,319,122 B1 | 11/2001 | Packes et al. |
| 6,319,125 B1 | 11/2001 | Acres |
| 6,329,213 B1 | 12/2001 | Tuttle et al. |
| 6,379,247 B1 | 4/2002 | Walker et al. |
| 6,394,907 B1 | 5/2002 | Rowe |
| 6,398,649 B1 | 6/2002 | Sugaya |
| 6,419,190 B1 | 7/2002 | Nguegang |
| 6,424,884 B1 | 7/2002 | Brooke, Jr. et al. |
| 6,471,590 B2 | 10/2002 | Saunders |
| 6,514,140 B1 | 2/2003 | Storch |
| 6,547,664 B2 | 4/2003 | Saunders |
| 6,558,256 B1 | 5/2003 | Saunders |
| 6,612,928 B1 | 9/2003 | Bradford et al. |
| 6,629,019 B2 | 9/2003 | Legge et al. |
| 6,641,035 B1 | 11/2003 | Predescu et al. |
| 6,675,152 B1 | 1/2004 | Prasad et al. |
| 6,682,421 B1 | 1/2004 | Rowe et al. |
| 6,695,699 B2 * | 2/2004 | Beaulieu ................. 463/25 |
| 6,712,698 B2 | 3/2004 | Paulsent et al. |
| 6,811,486 B1 | 11/2004 | Luciano, Jr. |
| 6,812,824 B1 | 11/2004 | Goldinger et al. |
| 6,813,609 B2 | 11/2004 | Wilson |
| 6,852,031 B1 | 2/2005 | Rowe |
| 6,878,062 B2 | 4/2005 | Bjorklund et al. |
| 6,887,154 B1 | 5/2005 | Luciano et al. |
| 6,912,398 B1 | 6/2005 | Domnitz |
| 6,920,561 B1 | 7/2005 | Gould et al. |
| 6,923,721 B2 | 8/2005 | Luciano et al. |
| 2002/0077173 A1 | 6/2002 | Luciano et al. |
| 2002/0194619 A1 | 12/2002 | Chang et al. |
| 2003/0032471 A1 | 2/2003 | Darder |
| 2003/0032474 A1 | 2/2003 | Kaminkow |
| 2003/0036425 A1 | 2/2003 | Kaminkow et al. |
| 2003/0045354 A1 | 3/2003 | Giobbi |
| 2003/0078101 A1 | 4/2003 | Schneider et al. |
| 2003/0162593 A1 | 8/2003 | Griswold |
| 2005/0054439 A1 | 3/2005 | Rowe et al. |
| 2006/0127097 A1 * | 6/2006 | Obrea et al. ................. 398/115 |

FOREIGN PATENT DOCUMENTS

| | | |
|---|---|---|
| EP | 1120757 | 8/2001 |
| EP | 1 351 180 | 10/2003 |
| JP | 07-505079 | 6/1995 |
| JP | 11-019330 | 1/1999 |
| JP | 2000-210464 | 8/2000 |
| JP | 2002-74506 | 3/2002 |
| JP | 2002-78954 | 3/2002 |
| WO | WO 98/47589 | 10/1998 |
| WO | WO 00/38089 | 6/2000 |
| WO | WO 02/058020 | 7/2002 |
| WO | WO 03/013678 | 2/2003 |
| WO | WO 03/025828 | 3/2003 |
| WO | WO 03073386 | 9/2003 |
| WO | WO 2004/052656 | 6/2004 |
| WO | WO 2006/020413 | 2/2006 |

OTHER PUBLICATIONS

International Search Report and Written Opinion dated Nov. 15, 2005 for corresponding PCT Application No. PCT/US2005/026777; 7 pgs.

U.S. Appl. No. 09/718,974, entitled "EZPAY™ Smart Card and Ticket System," by inventor Rowe, filed on Nov. 22, 2000 (Pat No. 6,852,031).

The Straight Dope, Jul. 24, 2001 http://www.strightdope.com/mailbag/mpreenstamps.html.

S&H Greenpoints Web page, 2001, Sperry & Hutchinson Company, Inc. heep://www.greenpoints.com.

Marshall Fey, Slot Machines, A Pictorial History of the First 100 years, 1983, Liberty Belle Books, pp. 100-117.

Rankl W et al.: "Handbuch der Chipkarten, Kontaktbehaftete Karten" Handbuch Der Chipkarten. Aufbau-Funktionsweise-Einsatz Von Smart Cards, Muenchen: Carl Hanser Verlag, DE, 1999, pp. 110-125, XP002242017.

RFID "Basics Primer", Automatic Identification Manufacturers, Sep. 28, 1999, pp. 1-17. http://www.aimglobal.org/technologies/rfid/resources/_papers/rfid_basics_primer.htm.

Bar Code 1, "2-Dimensional Bar Code Page", Adams Communication, Jun. 20, 2002, pp. 1-13. http://www.adams1.com/pub/russadam/stack.html.

Bar Code 1, "Bar Code Readers Page", Adams Communication, Jun. 20, 2002, pp. 1-5. http://www.adams1.com/pub/russadam/readers.html.

Symbol®, "Encoded Fingerprint Scanned by Symbol PDF417 Reader", Symbol Tech, Dec. 22, 1998, pp. 1-3. http://www.symbol.com/news/pressreleases/pressreleases_pdf417prod_ph.htm.

Economist, "Where's the Smart Money?" Feb. 7, 2002. www.Economist.com.

V.L Engineering, "Hand Held terminal-decoder for invisible bar codes", Jun. 20, 2002, http://www.vlengineering.com/products/wizard_CT6.html.

Summary of Herbst Presentation given by Rick Rowe on Aug. 12, 2003.

Sandia National Laboratories, "Technology Highlight: Spread Spectrum Barcode Technology," Sandia/California News, downloaded Oct. 27, 2005.

International Search Report mailed Oct. 18, 2002 from PCT Application No. PCT/US2002/025105; 3 pgs.

International Search Report mailed Mar. 2, 2004 for PCT Application No. PCT/US2003/023872; 7 pgs.

Office Action dated Oct. 4, 2005 received in related U.S. Appl. No. 10/214,936; 10 pgs.

Office Action dated Jun. 30, 2006 received in related U.S. Appl. No. 10/214,936; 15 pgs.

Office Action dated Oct. 31, 2006 in related U.S. Appl. No. 10/214,936; 16 pgs.

Combined Search and Examination Report dated Feb. 15, 2007 from corresponding UK Application No. GB0620781.5; 5 pgs.

Office Action dated Sep. 19, 2002 from related U.S. Appl. No. 09/927,742, (16 pages).

Office Action dated Mar. 10, 2003 from related U.S. Appl. No. 09/927,742, (16 pages).

Office Action dated Aug. 20, 2003 from related U.S. Appl. No. 09/927,742, 18 pages.

Final Office dated Mar. 20, 2007 received in related U.S. Appl. No. 09/927,742, 23 pages.

Final Office Action dated Apr. 24, 2007 received in related U.S. Appl. No. 10/214,936.

Symbol, Wireless for Beginners, Sep. 1, 2001, Symbol Tech.

Office Action dated Sep. 5, 2007 received in related U.S. Appl. No. 10/214,936.

Office Action dated Sep. 20, 2007 received in related U.S. Appl. No. 09/927,742.

Office Action dated Oct. 5, 2007 received in related U.S. Appl. No. 10/914,944.

Examination Report dated Jan. 16, 2008 from European Patent Application No. 05776662.8.

Examination Report dated Jan. 30, 2008 from United Kingdom Patent Application No. 0620781.5.

Japanese Office Action dated Mar. 5, 2008 from JP Application No. 2004-256237, 4 pgs.

U.S. Office Action dated Apr. 16, 2008 from related U.S. Appl. No. 10/914,944; 19 pgs.

U.S. Office Action dated May 28, 2008 from related U.S. Appl. No. 11/830,739.

Japanese Office Action dated Dec. 8, 2008 from related JP Application No. 2004-256237; 4 pgs.

U.S. Office Action dated Jun. 9, 2008 from U.S. Appl. No. 09/927,742; 21 pgs.

Final U.S. Office Action dated Jun. 12, 2008 from related U.S. Appl. No. 10/214,936; 14 pgs.

United Kingdom Office Action dated Jun. 24, 2008 from related UK Application No. 0620781.5; 2 pgs.

Chinese Office Action dated Jul. 18, 2008 from related CN Application No. 200580027057.X; 6 pgs.

Australian Office Action dated Jul. 18, 2008 from related AU Application No. 2003257941; 3 pgs.

U.S. Office Action dated Nov. 12, 2008 from U.S. Appl. No. 09/927,742; 12 pgs.

U.S. Office Action dated Dec. 23, 2008 from U.S. Appl. No. 10/214,936; 16 pgs.

U.S. Final Office Action dated Feb. 19, 2009 from U.S. Appl. No. 11/830,739; 13 pgs.

U.S. Office Action dated Apr. 17, 2009 from U.S. Appl. No. 09/927,742; 12 pgs.

U.S. Office Action dated Apr. 22, 2009 from related U.S. Appl. No. 10/914,944; 19 pgs.

China Office Action dated Jun. 12, 2009 from Application No. 200580027057.X; 5 pgs.

International Preliminary Examination Report dated Jun. 11, 2003 issued in PCT Application No. PCT/US02/25105.

* cited by examiner

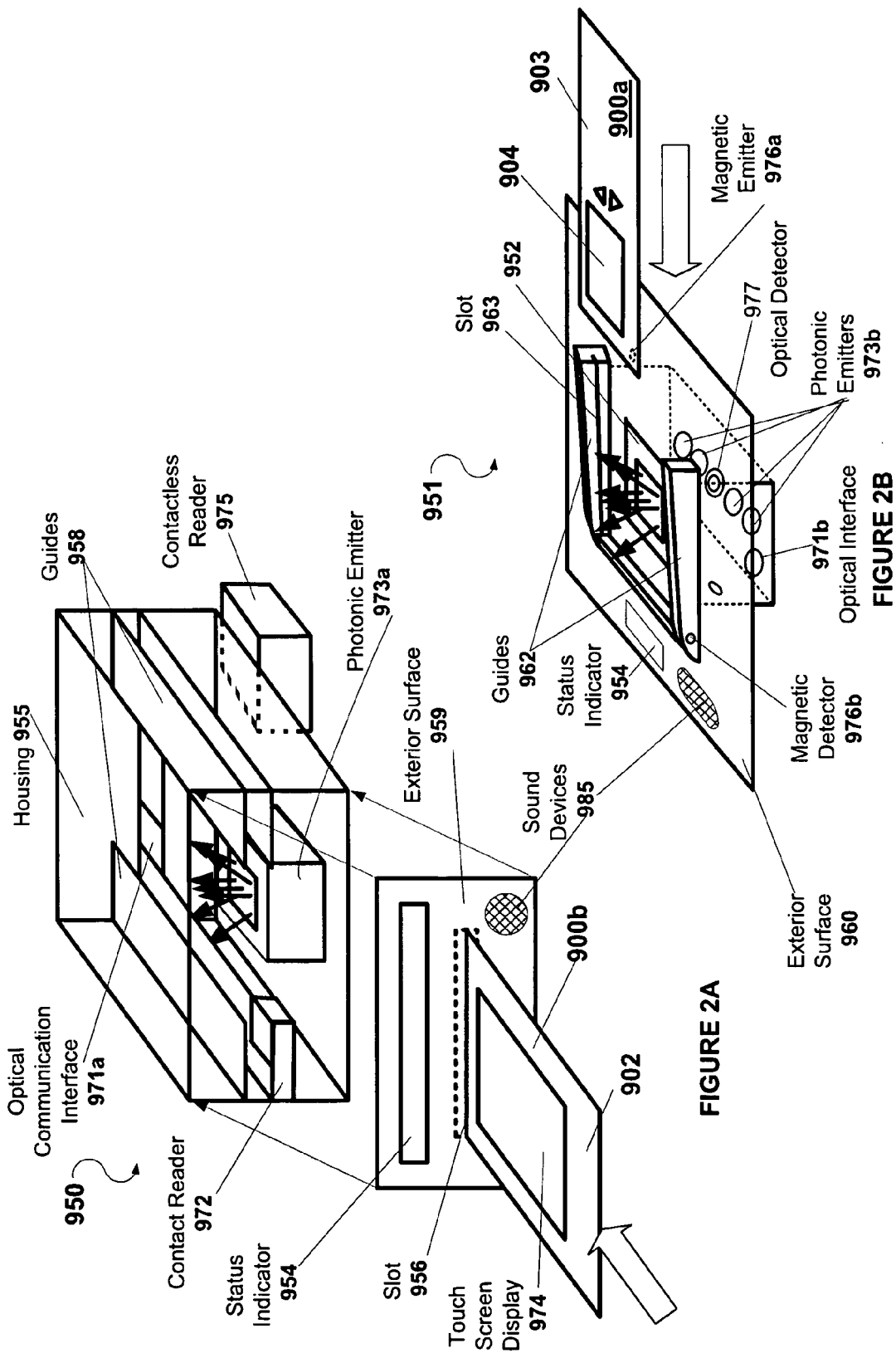

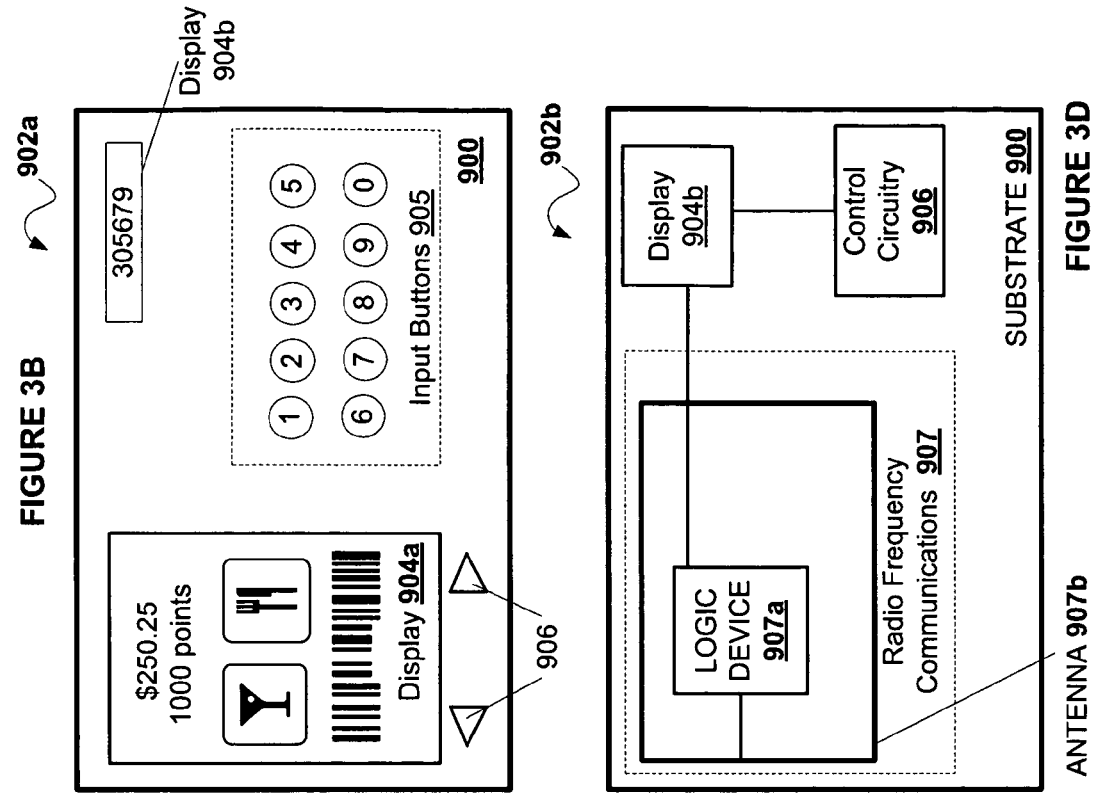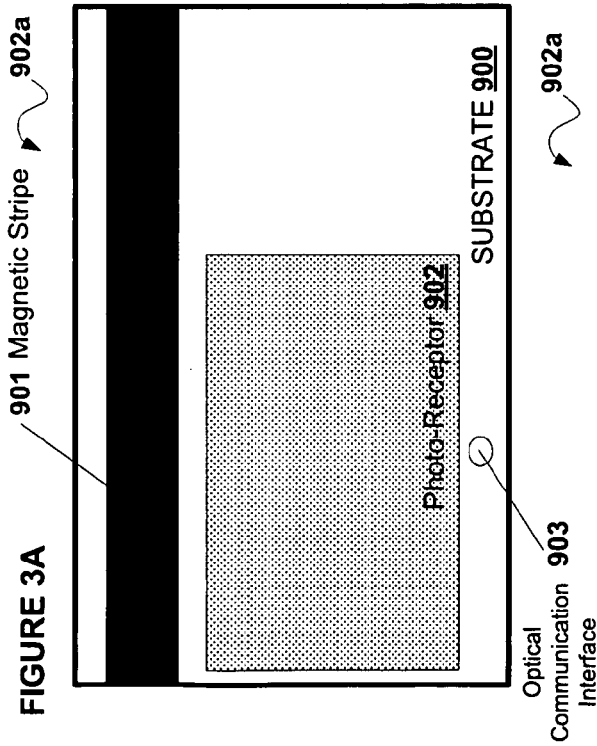

CONTACTLESS PLAYER CARD WITH IMPROVED SECURITY

COPYRIGHT NOTICE

A portion of the invention of this patent document contains or may contain material which is subject to copyright protection. The copyright owner has no objection to the photocopy reproduction by anyone of the patent document or the patent invention in exactly the form it appears in the Patent and Trademark Office patent file or records, but otherwise reserves all copyright rights whatsoever.

TECHNICAL FIELD

The present invention relates generally to gaming devices and systems, and more specifically to secure fund transactions on a gaming machine.

BACKGROUND

Casinos and other forms of gaming comprise a growing multi-billion dollar industry both domestically and abroad, with electronic and microprocessor based gaming machines being more popular than ever. A gaming entity that provides gaming services may control gaming devices that are globally distributed in many different types of establishments. For example, gaming machines may be placed in casinos, convenience stores, racetracks, supermarkets, bars and boats. Further, via a remote server, a gaming entity may provide gaming services in locale of a user's choosing, such as on a home computer or on a mobile device carried by the user.

Electronic and microprocessor based gaming machines can include various hardware and software components to provide a wide variety of game types and game playing capabilities, with such hardware and software components being generally well known in the art. For example, bill validators, coin acceptors, card readers, keypads, buttons, levers, touch screens, displays, coin hoppers, player tracking units and the like are examples of hardware that can be coupled to a gaming machine. Software components can include, for example, boot and initialization routines, various game play programs and subroutines, credit and payout routines, image and audio generation programs, security monitoring programs, authentication programs and a random number generator, among others.

The functions available on a gaming machine may depend on whether the gaming machine is linked to other gaming devices. For instance, when connected to other remote gaming devices, a gaming machine may provide progressive jackpots, player tracking and loyalty points programs, cashless gaming, and bonusing among other items. Many of these added components, features and programs can involve the implementation of various back-end and/or networked systems, including more hardware and software elements, as is generally known.

In a typical casino-based electronic gaming machine, such as a slot machine, video poker machine, video keno machine or the like, a game play is initiated through a wager of money or credit, whereupon the gaming machine determines a game outcome, presents the game outcome to the player and then potentially dispenses an award of some type, including a monetary award, depending upon the game outcome. In this instance, the gaming machine is operable to receive, store and dispense indicia of credit or cash as well as calculate a gaming outcome that could result in a large monetary award. The gaming machine is enabled to operate in this manner because it is placed typically in a location that is monitored (e.g., a casino), the gaming machine hardware and software components are secured within a locked cabinet and the gaming machine includes a security system for detecting fraud or theft attempts.

A gaming entity may provide gaming services to tens of thousands of users. For instance, a single land-based casino may include thousands of gaming machines and many different table games and a single gaming entity may comprise many different locations. In a gaming environment, players want to be able to 1) quickly and easily move between various gaming activities, such as gaming machines and table games, 2) easily move their funds on and off gaming machines or gaming tables in a secure manner while maintaining privacy and 3) receive rewards and comps commiserate with their value to the casino. The ability of a casino operator to maximize their operating profits and keep their customers happy is linked to their ability to provide these capabilities. In view of the above, it would be desirable to provide gaming apparatus and method that address these needs.

SUMMARY

The present invention addresses the need described above by providing a gaming system that is compatible with portable card devices. Each of the portable card devices may include a photovoltaic cell that is configured to provide power for a logic device on the card. The gaming system may comprise a number of host devices each coupled to one or more gaming machines and/or gaming tables. The gaming machines may be operable to provide wagering on an outcome of a game of chance, display the outcome of the game of chance, accept cash or an indicia of credit and dispense an award, such as cash or indicia of credit, to a player utilizing the gaming machine. The gaming machines or gaming tables may be configured to accommodate portable card devices including communicating with these cards via an optical communication interface and/or providing a photonic source compatible with a photovoltaic cell on the card. One or more transactions on the gaming machine, such as a transfer of cash or indicia of credit on or off the gaming machine or an initiation of a player tracking session, may be enabled using photonic-powered card devices and associated hardware/software described herein.

In a particular embodiment, the portable card devices may be photonic-powered card devices. The photonic powered-cards may communicate with the gaming machines or gaming tables via an optical communication interface, such as an IrDA compatible interface. The photonic-powered cards may also include a photovoltaic cell configured to generate power for a logic device on the photonic-powered card. In one embodiment, the photonic-powered card may store gaming information and may be configured so that it can only be interrogated for the gaming information when the photovoltaic cell is activated. In another embodiment, photonic-powered card devices may comprise a photo-sensor instead of a photovoltaic cell and may be configured so that it can only be interrogated for gaming information when the photo-sensor is activated. In particular embodiments, the photonic-powered cards may include a display device and an omni-directional wireless interface for receiving messages from one or more of the host devices in the gaming system, which may be output to the display device.

One aspect of the present invention may be characterized as comprising a gaming machine. The gaming machine may comprise 1) a cabinet; 2) a master gaming controller, enclosed within said cabinet, designed or configured a) to control a wager-based game played on the gaming machine; b) to control a photonic power source configured to provide power to a photonic-powered card; c) to communicate with the photonic-powered card via an optical communication interface using an optical communication protocol; d) to communicate with one or more remote servers via a network interface; 3) a display device, coupled to the cabinet, configured to display the wager-based game; 4) an acceptor mechanism, coupled to an outer surface of the cabinet, configured to receive the photonic-powered card in a position that allows the photonic card to i) receive photons emitted from the photonic power source and ii) communicate with the master gaming controller via the optical communication interface; 5) the photonic power source located within an interior portion of the cabinet aligned with the acceptor mechanism; 6) the optical communication interface coupled to the master gaming controller and aligned with the acceptor mechanism; 7) the network interface coupled to the master gaming controller; 8) an input mechanism, coupled to the cabinet, for receiving cash or an indicia of credit for making wagers on the wager-based game; and 9) an output mechanism, coupled to the cabinet, for outputting cash or an indicia of credit.

In particular embodiments, the dimensions of the photonic powered-card may conform to ISO 7810 and/or ISO 7813. The photonic power source may comprise one or more LEDs. The photonic power source may be configured to emit light that activates a photovoltaic cell coupled to the photonic-powered card. The photonic power source may be configured to emit light at one or more infrared wavelengths. Further, the photonic power source may be configured to emit light at one or more visible wavelengths.

In other embodiments, the optical communication interface may be an IrDA (Infrared Data Association) compatible interface. The gaming machine may further comprise an IrDA to USB (Universal Serial Bus) interface which may comprise an IrDA interface on one end and a connector on the other end that is compatible with a USB interface. The optical communication protocol may be an IrDA compatible communication protocol. The master gaming controller may be further designed or configured to communicate with the photonic-powered card via an IrFM (Infrared Financial Messaging) compatible communication protocol.

In yet other embodiments, the photonic power source may be configured to emit light through an aperture in an outer surface of the interior of the cabinet. A sensor may be located proximate to said aperture wherein the sensor is used to determine whether the aperture is covered by an object. The master gaming controller may be configured to only activate the photonic power source to emit light when it is determined that the aperture is covered by an object. Further, the master gaming may be configured to only enable the optical communication interface for communications when it is determined that the aperture is covered by an object.

In addition, after the photonic power source is activated to emit light, the master gaming controller may be further designed or configured to deactivate the photonic power source when it is determined that the aperture is only partially covered or not covered by an object. The optical communication interface may be located in the interior of the gaming machine and configured to emit communication signals via said aperture. The gaming machine may further comprise a status indicator mechanism configured to indicate successful communications between the master gaming controller and the photonic-powered card via the optical communication interface.

In another aspect of the present invention, a gaming system comprising a gaming machine and a photonic-powered card is described. The gaming machine of the gaming system may comprise; 1) a cabinet; 2) a master gaming controller, enclosed within said cabinet, designed or configured a) to control a wager-based game played on the gaming machine; b) to control a photonic power source configured to provide power to a photonic-powered card; c) to communicate with the photonic-powered card via a first optical communication interface using an optical communication protocol; d) to communicate with one or more remote servers via a network interface; 3) a display device, coupled to the cabinet, configured to display the wager-based game; 4) an acceptor mechanism, coupled to an outer surface of the cabinet, configured to receive the photonic-powered card in a position that allows the photonic card to i) receive photons emitted from the photonic power source and ii) communicate with the master gaming controller via the optical communication interface; 5) the photonic power source located within an interior portion of the cabinet aligned with the acceptor mechanism; 6) the first optical communication interface coupled to the master gaming controller and aligned with the acceptor mechanism; 7) the network interface coupled to the master gaming controller; 8) an input mechanism, coupled to the cabinet, for receiving cash or an indicia of credit for making wagers on the wager-based game; and 9) an output mechanism, coupled to the cabinet, for outputting cash or an indicia of credit.

The photonic-powered card of the gaming system may comprise: 1) a photovoltaic cell; 2) a second optical communication interface compatible with the first communication interface; 3) a memory for storing at least gaming information; and 4) a logic device, coupled to the photovoltaic cell, the second optical communication interface and the memory designed or configured to a) perform bi-directional communications using the optical communication protocol via the second optical communication interface; b) detect a power level generated by the photovoltaic cell and c) to determine the power level of the photovoltaic cell is above a threshold value and to only transmit the gaming information via the second optical communication interface when the power level of the photovoltaic cell is above the threshold value.

In particular embodiments, the photovoltaic cell may be configured to generate electrical power in response to receiving photons in primarily one of infrared wavelengths, visible wavelengths or combinations thereof. The photo voltaic cell is configured to provide power to the logic device. Further, the logic device may be further designed or configured, to only enable changes to the gaming information stored in the memory when the power level of the photovoltaic cell is above a threshold value.

In other embodiments, the logic device may be further designed or configured, to generate a one-time pin. The photonic-powered card may include a display configured to display the one-time PIN. The photonic powered card may include one or more input buttons, such as a number pad for inputting a PIN into the photonic powered card. The photonic-powered card may include a front side and a back side and wherein the photovoltaic cell and a receiving/transmitting portion of the second optical communication interface are both located on either the front side or the back side.

In yet other embodiments, the photonic-powered card may further comprise a display. The logic device may be further designed or configured to display a portion of the gaming information on the display. The display may include a bi-stable LCD. Further, the display may include a touch activated sensor and hence may be a touch screen display. The master gaming controller may be further designed or configured to generate a configuration interface for the display on a video display device coupled to the cabinet wherein the configuration interface may be designed or configured to allow a selection of one or more components of the gaming information to be made and formatted for output on the display of the photonic-powered card.

The gaming system may further comprise one or more omni-directional wireless communication interfaces where the photonic-powered card may be further configured to only receive messages via the omni-directional wireless communication interface. The card may be configured such that interrogations of the card for gaming information via this access mechanism are not allowed. The photonic-powered card may further comprise a display and may be configured to output a message received via the omni-directional wireless communication interface to the display.

Another aspect of the invention pertains to computer program products including a machine-readable medium on which are stored program instructions for implementing any of the methods described above. Any of the methods of this invention may be represented as program instructions and/or data structures, databases, etc. that can be provided on such computer readable media.

In certain embodiments the devices and methods described herein include, but are not limited to any combination of two or more, three or more, or four or more, of the elements or features described above and/or any combination of two or more, or three or more, or four or more of the elements or features described herein.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for enabling secure transactions on a gaming machine. These drawings in no way limit any changes in form and detail that may be made to the invention by one skilled in the art without departing from the spirit and scope of the present invention.

FIGS. 2A and 2B are diagrams of components associated with card-based interfaces for photonic cards for embodiments of the present invention.

FIGS. 3A-3D illustrate photonic cards and their associated components compatible with photonic card interfaces for embodiments of the present invention.

DETAILED DESCRIPTION

Figure 1:
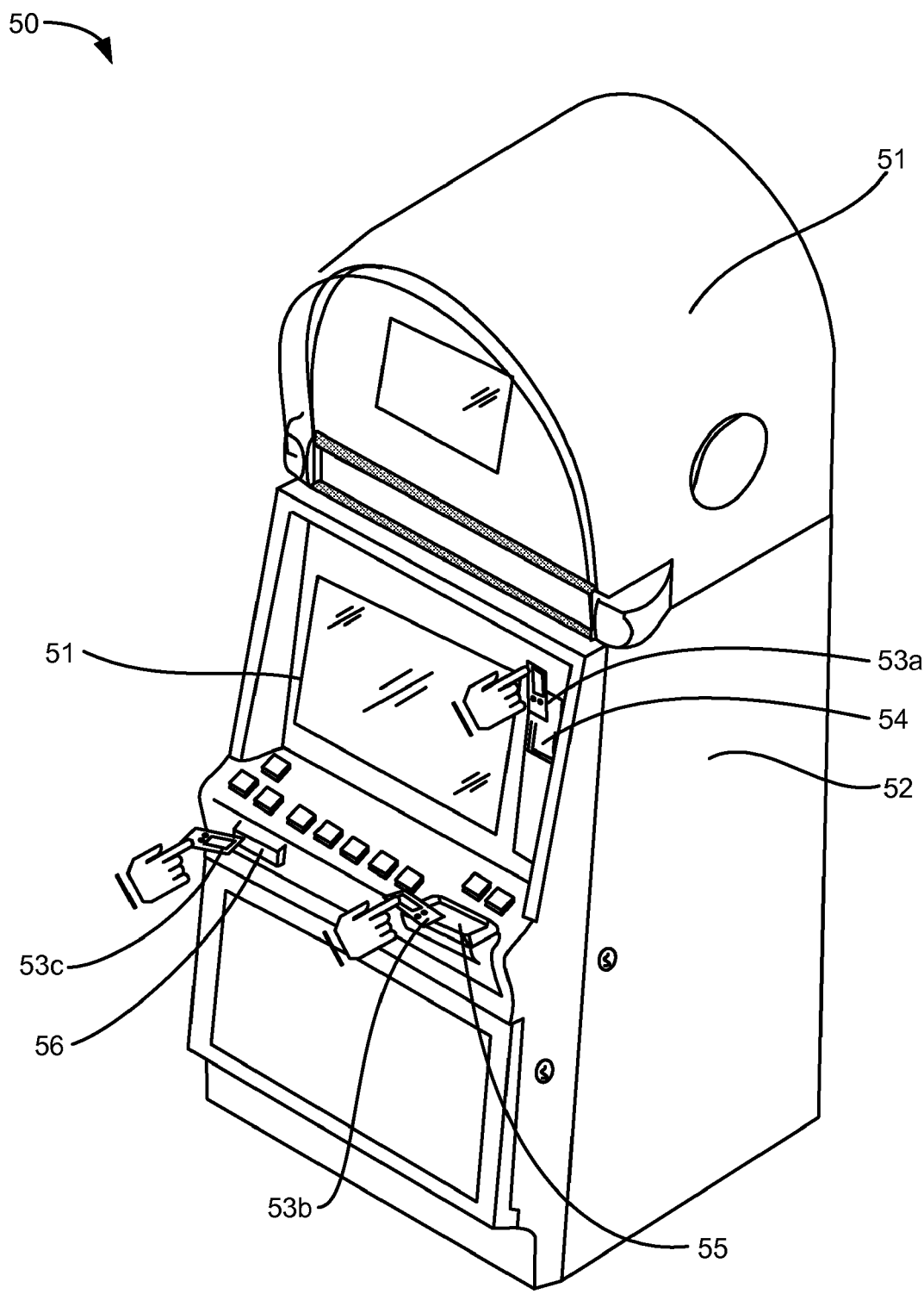
FIG. 1 is a perspective drawing of wager-based gaming machine including a number of portable device interfaces associated with portable card devices for embodiments of the present invention.

Exemplary applications of systems and methods according to the present invention are described in this section. These examples are being provided solely to add context and aid in the understanding of the present invention. It will thus be apparent to one skilled in the art that the invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein.

In the following figures, method and apparatus applicable to various gaming system configurations and their associated components are described. The gaming systems may comprise a network infrastructure for enabling one or more hosts to communicate with gaming machines. The gaming machines may be operable to provide wagering on a game of chance. A plurality of peripheral gaming devices, such as bill/ticket validators, printers, mechanical displays, video displays, coin hoppers, light panels, input buttons, touch screens, key pads, card readers, audio output devices, etc., may be coupled to the gaming machine. The gaming devices may be controlled by a master gaming controller executing authenticated software to provide a gaming interface for a game play experience on the gaming machine.

Aspects of the present invention describes method and apparatus for accessing gaming machines and initiating gaming transactions using portable devices are described. In particular, in regards to FIG. 1 embodiments of utilizing a portable card device with a gaming machine are described where the card device may include a photocell. In regards to FIGS. 2A-2B, embodiments of hardware coupled to a gaming machine or gaming table that may accommodate the portable card devices are described. In FIGS. 3A-3B, embodiments of portable card devices are described. In regards to FIGS. 4A-4B, flow charts for methods of utilizing a portable card device on a gaming machine from a perspective of a gaming machine and a portable card device are described, respectively. Following FIGS. 4A-4B, in FIG. 5, a gaming system that includes the portable card devices and the gaming machines are described where messages may be pushed to the portable card devices from a remote server. Finally, in FIGS. 6-9, details of a wager-based gaming machine, portable cards and an associated gaming system for embodiments of the present invention are described.

Accessing a player tracking account with a magnetic striped card encoded an account record is known in gaming. Disadvantages of using a magnetic striped card is the amount of information that can be stored on the card is very limited, the interface for reading or writing from the magnetic striped card requires the card to moved over a reader in a dynamic manner (i.e., contact between the magnetic stripe and reader is required, which limits the form factor of the interface) and information stored on the magnetic striped card is not easily discernable to the player. Advantages of using a magnetic striped cards are that they are portable (generally, credit card size) and inexpensive.

Using a radio-based method and apparatus to store account and player information may be implemented. Radio based methods may, in some instances, provide more flexibility in designing an interface for reading information because contact may not be necessary between the storage medium and the apparatus for reading information as information is sent through the air over a radio frequency of some wavelength. Some radio based methods and apparatus (e.g., RFID and Bluetooth™) that may be used with the portable card devices described below are described with respect to U.S. application Ser. No. 10/214,936, titled "Flexible Loyalty Point Programs," by Kaminkow, filed Aug. 6, 2002, and U.S. Pat. No. 7,112,138, titled, "Player Tracking Mechanisms in a Gaming Machine," filed Sep. 16, 2002, each which is incorporated herein in its entirety and for all purposes.

A disadvantage of radio-based methods, such as RFID technology, is that the stored information is broadcast in an omni-directional manner. The omni-directional manner of communication interface makes it easy for unauthorized devices to obtain information stored on such devices. In a gaming environment, this disadvantage could comprise player privacy and possibly player security. For instance, if credit information and/or personal information is stored on a device that broadcasts the information in an omni-directional manner via radio signals, a malevolent individual could intercept this information to identify players as targets for theft, such as identity theft or a personal attack. The apparatus and methods below may be configured or designed to minimize risks associated with omni-directional radio communications while allowing for advantages of using a contactless communication interface.

FIG. 1 is a perspective drawing of wager-based gaming machine 50 including a number of portable device interfaces 54, 55 and 56 associated with portable card devices 53a, 53b and 53c for embodiments of the present invention. The gaming machine 50 includes a top box 51, a cabinet 52, a main display 51 for outputting the game of chance and input buttons for making game decisions, such as wager amounts and initiating the game. A master gaming controller (not shown) that controls operations of the gaming machine 50, such as executing game programs, may be located within an interior region of the cabinet 52. The gaming machine 50 may include a network interface that allows it to communicate with one or more remote devices, such as servers that perform accounting functions, player tracking functions or provide executable game code and other game content to the gaming machine 50. Further, details of the gaming machine 50, networking and servers are described with respect to FIGS. 6-9.

The portable device interfaces 54, 55 and 56 are located at 3 locations on the gaming machine. The portable device interfaces may provide a communication interface between the gaming machine 50 and a portable device compatible with the interface. A gaming machine 50 or other gaming device, such as a gaming table or a kiosk, may include one or more of portable device interfaces, such as 54, 55 and 56.

Interface 54 is located on a substantially vertical surface of the gaming machine cabinet 52. It includes an acceptor mechanism for a portable card device that is configured to allow the portable card device to be rested within the device during communications. The acceptor mechanism may be configured to hold only a card shape device and may provide a relatively thin slot for holding the card shaped device, such as card 53a. In other embodiments, the acceptor mechanism may be configured to hold a plurality of different devices, such as the portable card device 53a or cell phones of varying dimensions.

Interface 55 includes substantially flat surface of the gaming cabinet 52. It is located next to various input buttons. A device, such as portable card device 53b, a cell phone (not shown) or portable device of another form factor may be rested on the substantially flat portion during communications between the portable device and the gaming machine 50. Interface 56 provides a slot and an internal acceptor for inserting a portable device, such as the portable card device 53c. The slot may be made large enough to accommodate devices of various dimensions or may be made to narrow so that it is limited to devices, such as a portable card devices of with a maximum width and thickness. The portable device may be inserted through slot and rested on the internal acceptor during communications.

The interfaces 54, 55 and 56 may be configured to provide a contactless communication interface for communications between the portable device, such as portable card device 53a, 53b and 53c and gaming machine 50. In one embodiment, the contactless communication apparatus may be configured for "free space optical communications." A characteristic of free space optical communications is that they tend to be more "line of sight" and directional requiring some minimal alignment between the communication emitters/receivers on each of a pair of devices that are to communicate. An advantage of "line of sight" communications is that it limits the opportunities for intercepting communications between devices using such communications.

For interfaces, 54, 55 and 56, one emitter/receiver located within an interior portion of the gaming machine, such as below the vertical surface associated with interface 54 or below the horizontal surface of interface 55. Each interface may include one or more emitter/receivers to allow it to accommodate different portable devices that include emitter/transceivers in different locations. For instance, interface 54 may include a first emitter/receiver located below the vertical surface such that it could communicate with another emitter/receiver orientated proximately perpendicular to the vertical surface, such as an interface on the bottom of portable card device 53a as shown in the figure. The interface mechanism might also include a cup-like holder with an emitter/transceiver on the bottom of the cup pointing upwards and proximately parallel to the vertical surface, such that a portable device, such as a cell phone with an emitter/transceiver on its top or bottom could be placed in the cup or held above the cup and communicate with the emitter/transceiver in the bottom of the cup when the emitter/transceivers on each device are aligned.

An example of a free space optical communication technology that may be employed with the devices described herein is IrDA (Infrared Data Association). The Infrared Data Association (IrDA) defines physical specifications communications protocol standards for the short-range exchange of data over infrared light, for uses such as personal area networks (PANs). IrDA specifications include IrPHY, IrLAP, IrLMP, IrCOMM, Tiny TP, IrOBEX, IrLAN and IrSimple and IrFM, for Infrared financial messaging (i.e., for making payments) also known as "Point & Pay". Other infrared communication formats and technology that may be used for devices described herein include HPSIR, ASKIR and CIR (Consumer IR).

The IrPHY (Infrared Physical Layer Specification) is the lowest layer of the IrDA specifications. Important specifications are: a) Range: standard: 1 m; low power to low power: 0.2 m; standard to low power: 0.3 m, b) Angle: minimum cone ±15° C.) Speed: 2.4 kbit/s to 16 Mbit/s, d) Modulation: baseband, no carrier and e) infrared window. IrDA transceivers communicate with infrared pulses (samples) in a cone that extends minimum 15 degrees half angle off center. The IrDA physical specifications require that a minimum irradiance be maintained so that a signal is visible up to a meter away. Similarly, the specifications require that a maximum irradiance not be exceeded so that a receiver is not overwhelmed with brightness when a device comes close. In practice, there are some devices that do not reach one meter, while other devices may reach up to several meters. Also, some devices may not tolerate extreme closeness. The typical sweet spot for IrDA communications is from 5 to 60 cm (2.0 to 24 in) away from a transceiver, in the center of the cone. IrDA data communications operate in half-duplex mode because while transmitting, a device's receiver is blinded by the light of its own transmitter, and thus, full-duplex communication may not be feasible. The two devices that communicate simulate full duplex communication by quickly turning the link around. The primary device controls the timing of the link, but both sides are bound to certain hard constraints and are encouraged to turn the link around as fast as possible.

Transmission rates fall into three broad categories: SIR, MIR, and FIR. Serial Infrared (SIR) speeds cover those transmission speeds normally supported by an RS-232 port (9600 bit/s, 19.2 kbit/s, 38.4 kbit/s, 57.6 kbit/s, 115.2 kbit/s). Since the lowest common denominator for all devices is 9600 bit/s, all discovery and negotiation is performed at this baud rate. MIR (Medium Infrared) is sometimes used to refer to speeds of 0.576 Mbit/s and 1.152 Mbit/s. Fast Infrared (FIR) is in common usage to denote transmission at 4 Mbit/s. "FIR" is sometimes used to refer to all speeds above SIR. However, different encoding approaches are used by MIR and FIR, and different approaches frame MIR and FIR packets. There are (VFIR) infrared transceivers available such as the TFDU8108 operating from 9.6 kbit/s to 16 Mbit/s. The UFIR (Ultra Fast Infrared) protocol, in development, will support speeds up to 100 Mbit/s. The Giga-IR protocol, also in development, will support speeds up to 1 Gbit/s (125 MB/s).

The IrLAP (Infrared Link Access Protocol) is the second layer of the IrDA specifications. It lies on top of the IrPHY layer and below the IrLMP layer. It represents the Data Link Layer of the OSI model. Some of the specifications are: 1) Access control, 2) Discovery of potential communication partners, 3) Establishing of a reliable bidirectional connection, 4) Distribution of the Primary/Secondary device roles, 5) Negotiation of QoS (Quality of Service) Parameters. On the IrLAP layer, the communicating devices are divided into a Primary Device and one or more Secondary Devices. The Primary Device controls the Secondary Devices. Only if the Primary Device requests a Secondary Device to send is it allowed to do so.

The IrLMP (Infrared Link Management Protocol) is the third layer of the IrDA specifications. It can be broken down into two parts. First, the LM-MUX (Link Management Multiplexer) which lies on top of the IrLAP layer. This protocol provides multiple logical channels and allows change of Primary/Secondary devices Second, the LM-IAS (Link Management Information Access Service), which provides a list, where service providers can register their services so other devices can access these services via querying the LM-IAS.

The optional Tiny TP (Tiny Transport Protocol) lies on top of the IrLMP layer. It provides: 1) transportation of large messages by SAR (Segmentation and Reassembly) and flow control by giving credits to every logical channel. The optional IrCOMM (Infrared Communications Protocol) lets the infrared device act like either a serial or parallel port. It lies on top of the IrLMP layer. The optional IrOBEX (Infrared Object Exchange) provides the exchange of arbitrary data objects (e.g., vCard, vCalendar or even applications) between infrared devices. It lies on top of the Tiny TP protocol, so Tiny TP is mandatory for IrOBEX to work. The optional IrLAN (Infrared Local Area Network) provides the possibility to connect an infrared device to a local area network. There are three possible methods: 1) Access Point, 2) Peer to Peer and 3) Hosted. IrLAN lies on top of the Tiny TP protocol, the Tiny TP protocol must be implemented for IrLAN to work. IrSimple achieves at least 4 to 10 times faster data transmission speeds by improving the efficiency of the infrared IrDA protocol. A normal picture from a cell phone may be transferred within 1 second.

Returning to FIG. 1, the portable card devices, such as 53*a*, 53*b* and 53*c*, other devices compatible with interfaces 54, 55 and 56 may include an internal power source, such as a battery. In other embodiments, the interfaces 54, 55 and 56 may include a power interface for providing power to a device proximate to the interface. In a particular embodiment, the portable card devices, 53*a*, 53*b* and 53*c* may include a photovoltaic cell for providing power to a logic and/or optical communication interface, such as an IrDA interface associated with the devices. The interfaces 54, 55 and 56 may include a photon emitter that is compatible with the photocells of the portable devices, such that the photocell generates power when the photon emitter is aligned with the photocell to receive photons. In one embodiment, the portable card devices may be configured to store gaming information and the portable card devices may be configured to only transmit the gaming information via the optical communication interface when it is receiving power generated via the photocell. Details of portable card devices with photocells (also referred to as photonic-powered cards), interfaces compatible with such devices and methods of operating the devices on a gaming machine are described below with respect to FIGS. 2A-4B.

FIGS. 2A and 2B are diagrams of components associated with card-based interfaces for photonic cards for embodiments of the present invention. In FIG. 2A, an interface mechanism 950, which may be an embodiment of interface 56, in FIG. 1 is shown. The interface mechanism includes an optical communication interface 971*a*, which may be an IrDA interface and a photonic emitter 973*a* for providing power to a photonic-powered card inserted into the interface 950. The photonic emitter 973*a* may be configured to emit light at a plurality of different wavelengths. The light may be emitted in the visible spectrum, the infrared spectrum or combinations thereof. The photonic emitter may comprise one or more LEDs, incandescent sources, fluorescent sources or combinations thereof.

The input interface 950 may comprise a rectangular housing 955. The rectangular housing may have an exterior surface 959 that is designed to form an exterior surface of the gaming machine. Thus, most of the housing 955 may be located within the interior of the gaming machine. The exterior surface 959 may be located on a horizontal surface, a vertical surface or on a surface with an inclination between horizontal and vertical located on the gaming machine or another device, such as a table game or a kiosk.

The exterior surface 959 includes a slot 956. The slot may be designed to receive the substrate 900. Guides 958 may be located in the interior of the housing. The guides 958 may be used to constrain the orientation of the substrate 900 after it is inserted in the slot 956. The photonic emitter 973a may be located at a distance below the guides 958. After the photonic card 902 is inserted in the slot, the photonic card may receive power via the photon emitter 973a and communicate via one or more of the optical communication interface 971a, the contact reader 972 (e.g., a magnetic stripe reader) or the contactless reader 975, which may be a omni-directional reader, such as an RFID tag reader.

The interface 950 may include a sound device, such as 985, and/or a status indicator 954. The status indicator 954 may be a light or a small display with text or image capabilities. The status indicator may be used to indicate a status of the interface or a status of a transaction associated with the interface. For example, the status indicator 954 may be used to indicate that a player tracking session is in progress, a photonic card has been successfully or unsuccessfully inserted into the interface 950, an inserted card is valid or non-valid, etc. The interface 950 may include one or more detection mechanisms, such as a sensor or a camera for determining whether the card 902 is inserted correctly.

The optical communication interface 971a may comprise an emitter/transceiver that is located a distance below optical communication interface. In one embodiment, optical communication interface may comprise an IrDA to USB interface with an IrDA emitter/receiver on one end and a USB connector on the other end. In one embodiment, the optical communication emitter/receiver may be located in a common chamber with the photonic emitter 973a. In other embodiments, the photonic emitter 973a and the optical communication emitter/receiver may be optically isolated from one another, such as in two separate chambers configured to minimize light leakage between the chambers.

The optical communication interface 971a is shown aligned such that it may make a line of site communication connection with another interface that is aimed toward it, such as an interface located on the bottom of card 902. The present invention is not limited to optical interface aligned in this manner. For instance, the card 902 may include an optical interface on the edge of the card that communicates in a line of sight parallel to guides 958. The housing may include a second or more optical communication interfaces that are compatible with this line of sight or other lines of sight. In other embodiments, the housing may include reflective surfaces that direct communications at angles that are compatible with the orientation of the optical communication interface 971a to expand the lines of sight for which the optical communication interface may be used.

The housing 955 may be designed for accepting a rectangular substrate 900b, such as a ticket or a photonic-powered card 902 via slot 956. A photocell may be located on a bottom surface (not shown) of the card. The substrate 900b may include printed 1-D bar-codes, 2-D bar-codes, printed graphics, an embedded RFID tag, a magnetic stripe, an embedded logic device(s), an embedded optical interface and combinations thereof. In one embodiment, the photonic-powered card 902 may include a display, such a touch screen display 974, configured to display gaming information and receive input via one or more input areas which may be configured on the display. Gaming information stored on the card may be transmitted to the gaming machine via the optical communication interface 971a. Gaming information stored on the card may also be updated via this interface or optionally contactless reader 975, which may or may not be included in the interfaces described herein.

In FIG. 2B an exterior mounted non-physical contact data interface 951 is shown. The top of the interface 951 may be surrounded by an exterior surface 960. In this embodiment, the exterior surface 960 is shown as horizontal but the present invention is not so limited and as previously described the exterior surface 960 may be orientated at different angles and may comprise multiple surfaces orientated at various angles relative to one other. For instance, the exterior surface 960 may comprise two surfaces orientated in a "V" shape with a relatively large angle such that the portable card device can rest in the "V." The interface 951 and the exterior surface 960 may by connected to a housing (not shown) extending below the exterior surface 960.

The interface 951 may include a translucent material that transmits an optical signal from the optical interface 971b and/or photons from the photonic emitters 973b. The photonic emitters 973b may emit photons at one or more different wavelengths. For instance, each of the four photonic emitters may be selected to emit at one or more wavelengths compatible with a photocell coupled to card 903.

The photonic emitters 973b and optical interface may be located in a chamber below the exterior surface 960. An aperture to the chamber, which as described above may be covered by a translucent or transparent material, may allow photons and optical signals from the photonic emitters 973b and optical interface 971b to be emitted from the chamber. In one embodiment, the aperture may be sized in conjunction with the portable card 903, such that in at least one orientation the portable card can cover the aperture. If the photonic emitters produce light at visible wavelengths and are bright, it may be desirable to have the aperture covered by the portable card when the photonic emitters 973b are turned on. It may also be desirable to operate the optical interface 971b only when the aperture is covered to block signal leakage from the optical interface 971b.

In this embodiment, when it is desirable to have the aperture with the photonic emitters covered, the interface 951 may include apparatus for determining the aperture is covered. For example, the chamber with the photonic emitters may include an optical detector 977 that measure the intensity of light in the chamber. A signal from the optical detector 977 may be utilized to determine whether the aperture is covered. The interface 951 may include a logic device, such as a controller, that is configured to turn the photonic emitters 973b on or off based upon the signal emitted from the optical detector. The controller may be configured to communicate with a master gaming controller on the gaming machine.

The logic device may include logic that allows the interface 951 to be calibrated when placed in its operational environment to account for ambient lighting conditions in the operational environment. The calibration routine may prompt a user to cover and then uncover the aperture. At the uncovered and covered conditions, a signal from the optical detector may be recorded, which may be used as a baseline by the controller for determining when to turn on or turn off the photonic emitters 973b.

In other embodiments, it may not be necessary to have the aperture to the photonic emitters covered during operation. For example, the photonic emitters 973b may emit light at a non-visible wavelength such as infrared. In another example, the brightness of the photonic emitters may be low enough to allow the emitters to be turned on as long as they are partially covered by the photonic powered card 903. The optical detector 977 and associated logic device may be configured to determine conditions where the aperture is only partially covered.

If it is acceptable to operate the photonic emitters 973*b* and/or optical interface 971*b* while the aperture is only partially covered. The aperture may be sized so that it is bigger than card 903 in one or more dimensions and/or card orientations. In one embodiment, the exterior surface 960 may not include guides 962 but may simply comprise a flat surface on which a portable card is placed. The flat surface may include markings defining an acceptable area to place the portable card or may include a raised bezel or other surface to indicate an acceptable area. In this embodiment, the portable card may be placed at any orientation within this area as long as the photocell and optical interface for the card allow a line of sight communication with the optical interface 971*b* and photonic emitters 973*b* of interface 951. For example, when the optical interface and photocell is located on the bottom of card 903, the card 903 would have to be orientated with the display 904 facing upwards.

In other embodiments, the interface 951 may be configured to operate with the photonic card in one or more preferred orientations. In one embodiment, the interface 951 may comprise 962 guides with a slot for constraining the orientation of the portable card 903. In another embodiment, the guides may comprise an additional optical interface that allows other types of devices such as a cell phone or PDA to be placed on the exterior surface and communicate via the interface 951. For instance, an optical interface could be located on a surface aligned perpendicular to the exterior surface, such that a device, such as a cell phone with an optical interface may be aligned with the optical interface.

The interface 951 may include one or more devices for detecting an orientation of the card including which side of the card is facing the aperture and/or which end of the card is inserted in the guides 962. In one embodiment, the interface 951 may comprise a camera and image recognizing techniques for recognizing a pattern on the card 903. An expected pattern may be compared with an image obtained from the camera to determine an orientation of the card. In another embodiment, the card may include sensor such as a magnetic sensor 967*b* that is configured to detect a magnetic emitter on card 903. The magnetic emitter may only be detected when the corner of the card with emitter is inserted such that is rests near the magnetic detector 976.

The interface mechanisms 950 and 951 may include a card status interface comprising one of a status light 954, a sound projection device 985 or combinations thereof. The light may be located at any location on the exterior surfaces 959 and 960. For interface 950, the light may be a strip with one or more lighting elements and may surround the slot in some embodiments. The status indicator could also be a display screen of some type such as a 16 digit LED display capable of displaying text messages. Further, the guides 962 may be translucent and back-lit. The backlighting color of the guides may be changed to indicate a card status, such as green for orientated correctly and a communication session properly initiated and red when the card is not orientated correctly or a communication session is not initiated. The sound devices 985 may be located on the exterior surfaces 959 and 960. The sound device 985 and status light 954 may be located or at other locations on the gaming machine and are not limited to exterior surfaces 959 and 960. In general, the sound device 985 and status light 954 may be used to provide information regarding the functioning of the interface 950 and 951 in any application for which they are used.

FIGS. 3A-3D illustrate photonic cards and their associated components compatible with photonic card interfaces for embodiments of the present invention. In FIG. 3A, a front side of portable card device 902*a*. The card 902*a* may comprise a substrate 900. The card 902*a* may include a photocell 912. The photocell 912 may be configured to provide power to circuitry embedded in the card, such as shown with respect to FIG. 3C.

The dimensions of the card may be governed by ISO 7810. ISO/IEC 7810:2003 is an international standard that defines the physical characteristics for identity or identification cards. The standard defines four card sizes: ID-1, ID-2, ID-3 and ID-000. The ID-1 format specifies a size of 85.60×53.98 mm (3.370×2.125 in). It is commonly used for banking cards (ATM cards, credit cards, debit cards, etc.). The proportion of sides is 1.5858, smaller than golden ratio (1.618:1). Other standards that the portable cards may conform in whole or in part include but are not limited to 1) ISO/IEC 7813 which defines additional characteristics of ID-1 plastic banking cards, for example a thickness of 0.76 mm and corners rounded with a radius of 3.18 mm, 2) ISO/IEC 7811 defines traditional techniques for recording data on ID-1 identification cards, namely embossed characters and several different magnetic recording formats and 3) ISO/IEC 7816 defines ID-1 identification cards with an embedded chip (smartcard) and contact surfaces for power, clock, reset and serial-data signals.

The photocell may cover 75% or less of the area of the back of card. In particular embodiment, the photocell may cover 50% or less of the area of the back of card 902*a*. In yet another embodiment, the photocell may cover ⅓ or less of the area of the card. The photocell may comprise a thin-film photocell generated on a flexible or rigid substrate. Examples of thin film photocell types include but are not limited to amorphous silicon, cadmium telluride or copper indium gallium deselenide. Nanosolar (San Jose, Calif.) is one producer of thin film photocells.

The card 902*a* may comprise an optical communication interface 903, which as previously described may be an IrDA compatible interface. Infrared receivers may contain a high-pass filter to remove background daylight or other ambient light source. This high-pass filter is used with the encoding on the link to ensure that long strings of zeros or ones are not lost in transmission. The encoding used on this link may be return-to-zero (RZ). Zeros may be represented by a pulse of ³⁄₁₆-bit duration, and ones by the absence of a pulse. For example, ³⁄₁₆ of a pulse width at 115,200 bits/s is 1.6 [Micro]s. The code may be power-efficient since infrared light is only transmitted for zeros. The tall narrow pulse has better signal-to-noise ratio performance than a short wide pulse of the same energy. The receiver may converts signal from an analog to a digital form by comparing them with a threshold voltage.

The card may optionally include a magnetic stripe 901. This may allow the card to be used in traditional magnetic striped card readers. The card 902*a* may include graphics or other patterns that allow the card to be recognized and possibly an orientation of the card to be determined. In one embodiment, the card 902*a* may include a photo-detector, which may be just a small photocell. The photo-detector may be configured to generate a signal in response to light of a particular wavelength and/or light pattern. For example, the light pattern may be on and off pulses of a particular duration. The control circuitry 906 of the card may be configured to only allow interrogation of gaming information stored in memory 906*b* when the photo-detector generates a signal that matches the expected light pattern. This capability may provide additional security. In one embodiment, the card may not include photocell 912 but only a photo-detector. Examples of light sensor/emitters and associated light patterns and security circuitry that may be used with the portable card devices is described in U.S. Pat. No. 6,575,833, "BATTERY POWERED GAMING MACHINE SECURITY MONITORING SYSTEM," by Stockdale, filed Jan. 4, 2000, which is incorporated in its entirety and for all purposes.

The front of the card 902b may include one or more displays that may occupy varying areas of the cards surface. In one embodiment, the card may include input buttons 905 and a display 904b for generating a one time password that may be used with a transaction, such as a transaction at a gaming machine or a game table. A user enters their PIN code via input buttons 905 to generate a one-time password, which is valid only for one transaction and may expire after a time period. This code, displayed on a card's display panel, 904b, may then be used to authenticate a transaction, such as a transfer of credits to the gaming machine from a remote account. The one time password may be generated by a logic device embedded in the card.

The display 904a may be configured to display a portion of gaming information stored on the card. The display may be a bi-stable LCD, such as an electronic paper display by E-ink (Cambridge, Mass.). The display may comprise an OLED. In another embodiment, the display may be an LCD. The display may display text, number and/or symbols. For example, the display may be used to display a value amount stored on the card or in an account associated with the card. An amount of loyalty points available in account associated card may be displayed. In one embodiment, the display may display a bar-code the bar-code may be an identifier for a particular player tracking account or an identifier for a credit value associated with a cashless system. In particular embodiments, the input buttons 906 may be used to change what gaming information is displayed on display 904a.

The arrows 905b may be pressed to change the information displayed on the display 904a. In one embodiment, a gaming device, such as a kiosk or a gaming machine may be configured to generate an interface that allows the gaming information to be stored on the card to be selected and information to be displayed from the gaming information on the display 904a to be selected. Also, the interface may allow transactions to be automatically implemented by the card. For instance, the card may be configured to automatically initiate a request for a drink whenever it first establishes communications with a gaming device.

In other embodiments, the display 904a may be a touch screen display. In this example, the card 902b may be configured to detect a touch at the drink and food symbols. This may trigger the card to initiate a transaction to order a drink or food. In one embodiment, these buttons could be pressed to initiate a transaction when the card is not in communication with a gaming device. For instance, a player could be carrying the card while walking between gaming devices and press the drink button or press one of the input buttons 905 to initiate a transaction. The transaction may be stored by the logic device on the card. When the card establishes communications with an interface at a gaming device, such as a gaming machine, a gaming table or a kiosk, the transactions stored on the card may be automatically initiated. For instance, a drink may be ordered if a drink transaction has been stored on the device.

In a particular embodiment, the display may be configured to generate electricity when exposed to a photonic source. In this embodiment, rather than using a separate photocell to generate power, the display itself could be used to generate power for the portable card device. In this embodiment, the display and optical interface would likely be located on the same side of the card.

In FIG. 3C, examples of some control circuitry that may be embedded in card 902a are described. The control circuitry may include a processor, such as CPU 906a. The CPU may be operable to perform various logical operations, such as generating a one-time password or allowing interrogation or updating of memory 906b with gaming information. Power control circuitry may be used to interpret signals generated from the photocell or a photoreceptor and determine whether an interrogation of memory 906b is to be allowed. Input 906d may interpret input signals from input devices such as input buttons 905, 906 or a touch screen sensor.

Display circuitry 906e may control activation of various display elements, such as pixels, when the display includes pixilated elements. The optical communication circuitry may control communications of the optical communication interface. The CPU 906a may be configured to communicate using a communication protocol compatible with the optical communication interface. The energy/storage circuitry may be configured to control charging of an internal power supply, such as a battery or capacitor 910 using energy obtained from photocell 912.

In one embodiment, the portable card device carried by a patron may be a smart card enabled Java card™. Java card™ technology enables smart cards and other devices with very limited memory to run small applications, often called applets, that employ Java™ technology. It provides smart card manufacturers with a secure and interoperable execution platform that can store and update multiple applications on a single device.

Applets developed with Java card™ technology may be configured run on any Java card™ technology-enabled smart card, independently of the card vendor and underlying hardware. Java card™ technology enables multiple applications to co-exist securely on a single smart card. New applications may be installed securely after a card has been issued, enabling card issuers to respond to their customer's changing needs dynamically. The Java card™ API may be compatible with international standards for smart cards such as ISO7816, or EMV (Standard for interoperation of integrated circuit card derived from Europay, Mastercard and Visa.).

There are many manufacturers of Java card™s. Examples of smart cards that may be utilized herein is provided by IBM (Armonk, N.Y.). IBM WebSphere Everyplace Chip Operating System, JCOP Edition is an implementation of several open smart card standards, such as Java card™, GlobalPlatform, ISO (7816, 14443). JCOP (Java card™ OpenPlatform) supports multiple hardware platforms, providing high-performance application execution on mid-to-low range, 8-bit smart-card chip platforms. All IBM JCOP editions have ROM memory free to contain a customer's standard applets, thus saving on expensive EEPROM. Free ROM for applet code varies between 16 kB and 56 kB.

The IBM Java card™ Open Platform (JCOP) family is available in various editions. All comply with at least the mandatory features of the Java card™ 2.2.1 and Global Platform 2.1.1 specifications. While specific editions may implement additional standards. Examples include, JCOP10, a DES, 3-DES and AES edition, JCOP20, an entry Public Key (RSA) edition, JCOP30, the entry, dual-interface (contact/contactless) edition, JCOP40/41, which adds a USB interface to the Java card™ Open Platform 30 cards, JCOP21sim, which includes PK-enabled GSM SIM edition, JCOP21id, which includes the FIPS-compliant PK edition and JCOP31bio, which includes on-card biometry-enabled PK dual-interface edition of JCOP. I The JCOP31 bio combines a contactless interface with high-end cryptographic and biometry capabilities. Other configurations are possible—for example, with specific algorithms, such as appropriate cryptographic or biometric algorithms. Details of apparatus and methods associated with JAM cards that may be used with the portable devices and interfaces are described in co-pending U.S. application Ser. No. 11/967,916, titled "IMPROVED METHODS AND ARCHITECTURE FOR CASHLESS SYSTEM SECURITY," filed Dec. 31, 2007, which is incorporated herein by reference and for all purposes.

In FIG. 3D, an embodiment is shown that includes a logic device 907a an antenna 907b for performing radio frequency communication 907. This circuitry may be isolated from control circuitry 906 such that gaming information stored on the card may not be accessed via this communication path. The radio frequency communications may allow messages to be pushed to the card and output to display 904b. In some embodiments, the identity of the card may be broadcast allowing messages to be directed to a specific card. The card may be also operable to receive messages broadcast to cards in general, such as all cards in a particular area of a casino or all cards in the casino.

The form of the messages may be a text message displayed on display 904a or 904b. In one embodiment, the card may be configured to scroll messages across an LED type display with a capability to render some amount of letters or numbers, such as display 904b. The portable cards may include a sound device or a vibration device that is activated to emit a sound or vibrate in response to receiving messages.

ISO has developed RFID standards for automatic identification and item management. This standard, known as the ISO 18000 series, covers the air interface protocol for systems likely to be used to track goods in the supply chain and may be used with the portable devices described herein. They cover the major frequencies used in RFID systems around the world. The seven parts are: 1) 18000-1: Generic parameters for air interfaces for globally accepted frequencies, 2) 18000-2: Air interface for 135 KHz, range 20-60 cm, 3) 18000-3: Air interface for 13.56 MHz, range less than 70 cm or less than 10 cm depending on the application, 4) 18000-4: Air interface for 2.45 GHz, 5) 18000-5: Air interface for 5.8 GHz, 6) 18000-6: Air interface for 860 MHz to 930 MHz, range 3.5 to 10 meters, and 7) 18000-7: Air interface at 433.92 MHz. Other wireless technology, such as Wi-fi or Bluetooth may also be used.

Radio wave communications, such as RFID or Bluetooth™ differ significantly in their propagation characteristics as compared to an optical communication standard such as IrDA. Because infrared uses the nonvisible infrared light spectrum, IrDA communication is blocked by obstacles that block light (such as walls, doors, briefcases, and people). The signal wavelength used with Bluetooth communication (about 12.5 cm, at its associated frequency of 2.4 GHz) is three orders of magnitude greater than that of IrDA. At this wavelength, radio frequency (RF) communications can penetrate many of these sorts of obstacles. Recent advances in infrared technology have enabled more diffuse transmission patterns, although much of the IrDA equipment in use today uses a relatively narrowly focused beam, which usually requires that the two devices engaged in IrDA communication be aligned with (pointed at) each other. RF transmission patterns radiate in some pattern (ideally, spherical) around the radio antenna, so any two devices within range can communicate with each other, whether or not they are "pointed at" each other (in fact, the second device might not be visible at all to the user of the first device, as it could be in another room behind doors and walls or even on another floor of a building, for example).

The effective range for Bluetooth™ wireless communication is about 10 meters using the standard 0 dBm radio. With optional power amplification of up to 20 dBm, range on the order of 100 meters can be achieved. IrDA range is about 1 meter and, as noted already, generally requires a line of sight to establish a connection. The limited range for IrDA may also allow reuse of the infrared medium, allowing multiple pairs of devices to communicate at the same time, which is more difficult with an omni-directional standard such as BlueTooth.™

Figure 4A:
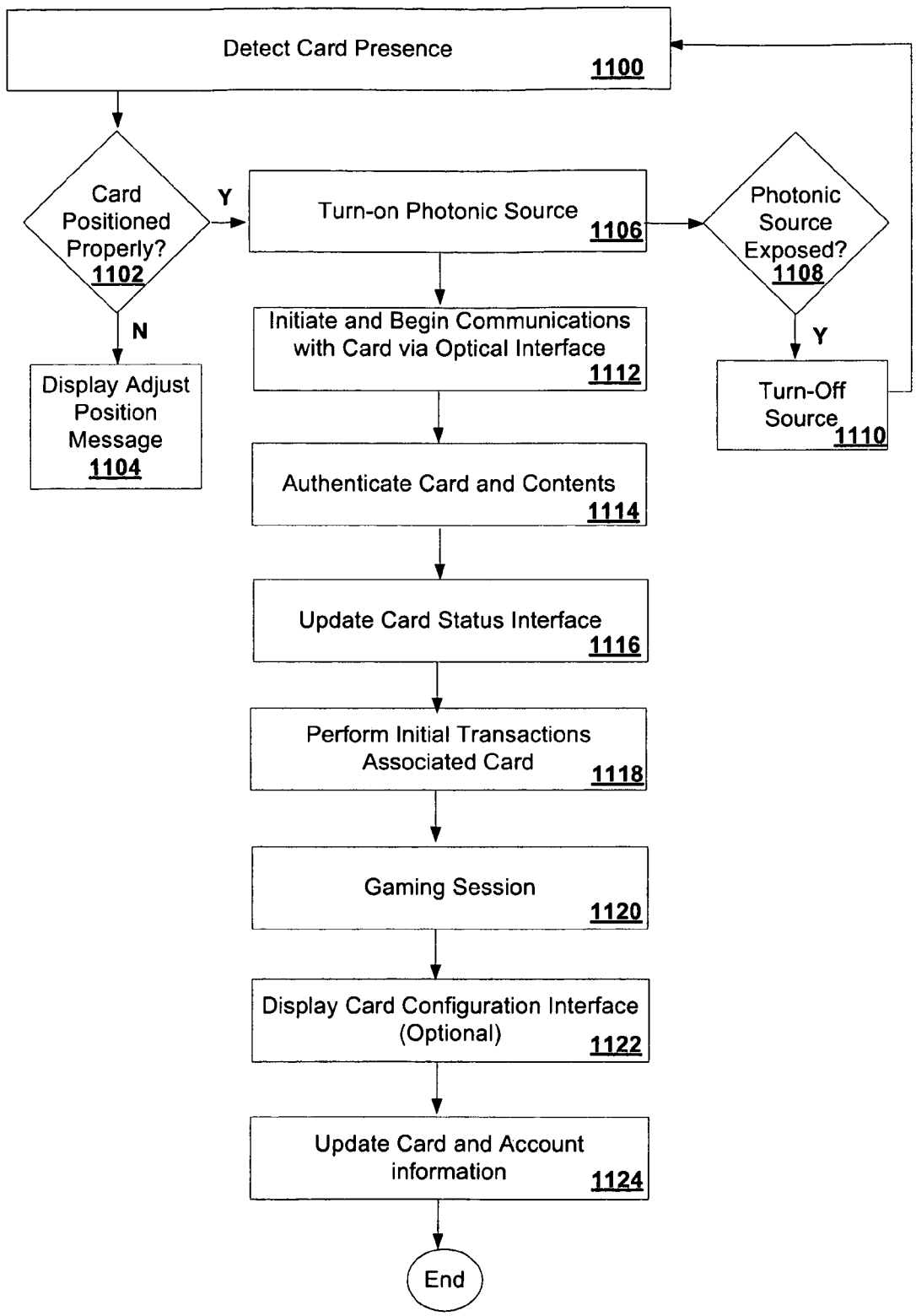
FIGS. 4A is a flow chart of a method on a gaming machine of operating a photonic card interface with a photonic card.

FIGS. 4A is a flow chart of a method on a gaming machine of operating a photonic card interface with a photonic card. In 1100, the gaming machine may detect the card presence. Various apparatus and methods may be used to detect the card presence, such as but not limited to, recognizing a signal source emitted from device, image/pattern recognition, a contact sensor, a change in lighting conditions. In 1102, the gaming machine may check to determine if the card is orientated properly. For instance, a photocell and an optical communication interface associated with the card may need to be placed such that are aligned with photonic emitters/receivers on the gaming machine. When the card is not aligned the gaming machine may generate a message or change a status of an indicator that indicates the position of the card needs to be adjusted.

In 1106, if the card is positioned properly, a photonic source may be turned on. The photonic source may activate a photocell and/or photo-detector on the card. In 1108, in some embodiments, the gaming machine may be configured to determine if the photonic source has been exposed, i.e., the aperture through which the photons is emitted is totally or partially uncovered. In one embodiment, a light sensor that measures an intensity of light may be employed. In this embodiment, when it is detected that some threshold condition has been met where too much light is being emitted from the gaming machine and/or the presence of a card can no longer be detected, the photonic source may be turned off in 1110 and the gaming machine may enter a state in 1100 where it is waiting to detect a card presence.

In 1112, the gaming machine may begin communications with the card via the optical interface. In 1114, the gaming machine may attempt to authenticate the card and its content. In 1116, when a card has been properly authenticated, the gaming machine may change a card status interface to indicate the card is valid. In 1118, one or more transactions associated with the card may be initiated. For instance, the gaming machine may initiate a loyalty program session, initiate fund transfers from a remote device to the gaming machine, initiate transactions stored on the card, such as orders for a drink or initiate transactions that customize the configuration of the gaming machine. These transaction may require additional player input. For instance, a player may be requested to enter a one-time password generated from the card into the gaming machine to initiate a transaction.

In 1122, the gaming machine may provide a configuration interface that allows information displayed and/or stored on the card to be configured. From the configuration interface or in response to the determining a gaming session has ended, the gaming machine may update the card with new gaming information. The gaming machine may also notify a remote device, such as a remote server, of the current status of the card and information that is stored on the card.

Figure 4B:
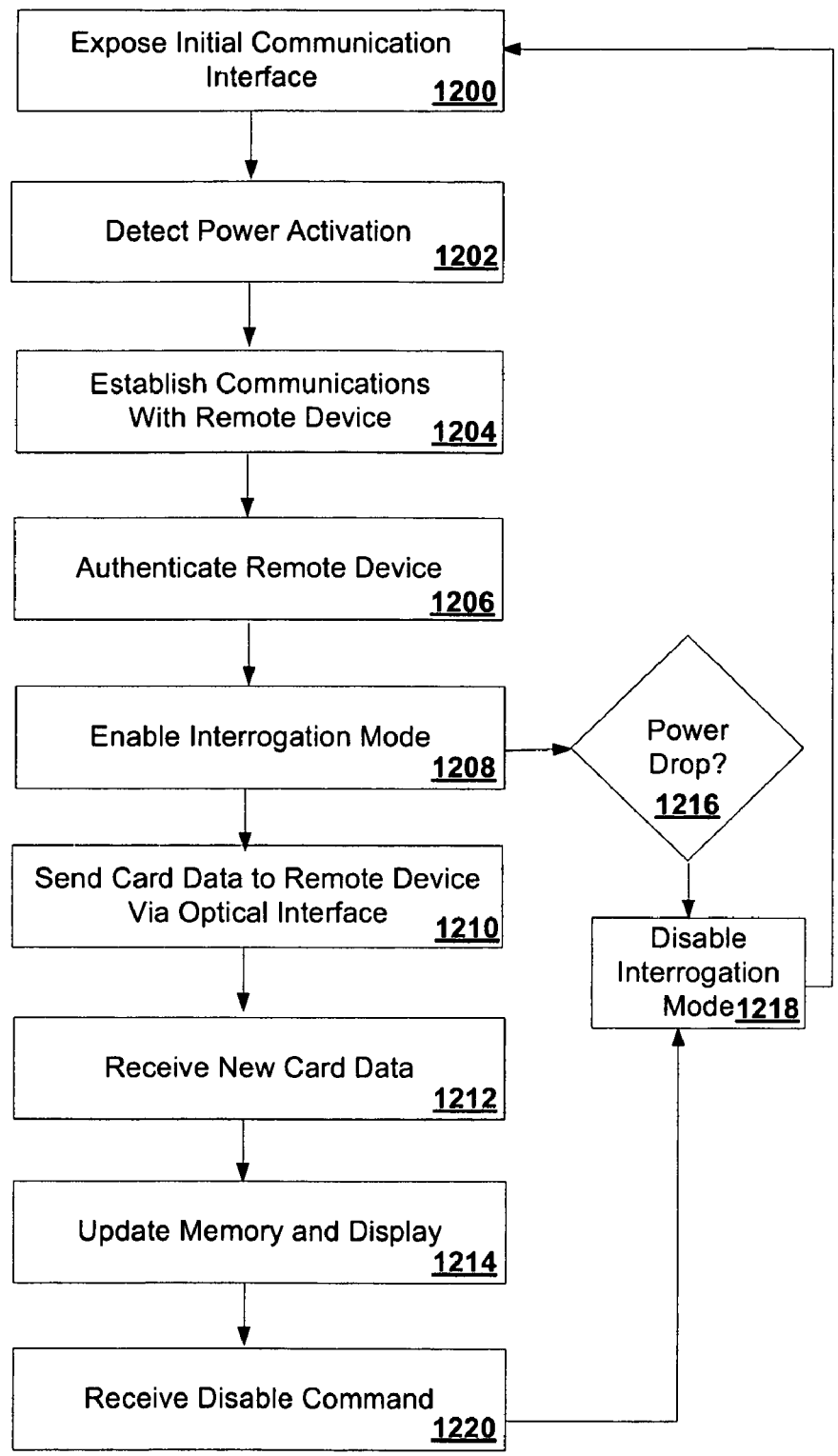
FIGS. 4B is a flow chart of a method on a photonic card of operating with a photonic card interface on a gaming machine.

FIGS. 4B is a flow chart of a method on a photonic card of operating with a photonic card interface on a gaming machine. In 1200, the card may expose an initial communication interface. With the initial communication interface, which may be signals generated through an optical communication interface (i.e., provides a line of sight communication), the card may expose enough information to initiate an attempt at communications. In 1202, the card may be configured to detect an activation of a photocell on the card. For instance, the card may be configured to detect an increase in power, voltage and/or current associated with the cell which results when the cell is exposed to a compatible light source. In other embodiments, as previously described, the card may be configured to detect an activation of a photo-detector on the card.

In 1204, the card may establish initial communications with the remote device, such as initialize an IrDA based communication session. For IrDA, the IrLAP has three distinct phases of operation: link initialization, nonoperational mode, and operational mode. Nonoperational and operational modes are distinguished by the absence or presence of a connection with another device. During link initialization, the IrLAP layer chooses a random 32-bit device address. This address is randomly chosen to negate the need to select and maintain fixed device addresses for all IrDA devices. Although it is unlikely that two or more devices within range of each other will choose the same address, procedures are defined to detect and resolve address collisions. After the link is initialized, the IrLAP layer enters nonoperational mode.

The nonoperational mode is derived from HDLC's (High-level Data Link Control protocol) normal disconnect mode. In this mode, all devices may contend for the medium. To do this, each device may check that the medium is not busy before transmission. This may be achieved by listening for activity—that is, listening for physical layer transitions for at least 500 ms. Transmissions in the normal disconnect mode use link parameters that can be supported by all IrDA devices at a rate of 9600 bits/s. In this mode, the device will initiate device discovery, address resolution (if required), and connection establishment.

Once the connection has been established, the IrLAP layer may move into the operational or, in HDLC terms, normal response mode. This mode is an unbalanced mode of operation in which one device assumes the role of primary station and the other assumes a secondary role. This is the phase in which information is exchanged under control of the primary station. The link parameters are negotiated during the connection setup procedure and remain constant during the connection. During this phase, all other devices within range of either the primary or secondary stations remain idle in the normal disconnect mode. The two communicating devices therefore have unrestricted access to the medium for the duration of the connection. Once the information has been transferred, the link is disconnected and the device may return to the normal disconnect mode.

The discovery procedure is the process an IrDA device uses to determine whether or not there are any devices within communications range. In doing so, the device discovers the address of any device within range, the version number of the IrLAP protocol operating in each device, and some discovery information specified by the IrLMP layer in each device. The discovery procedure is controlled by the initiating device, which divides the discovery process into equal periods or time slots. The slotted nature of the discover procedure minimizes the likelihood of collisions when there are multiple devices within range. After waiting for a period of 500 ms (normal disconnect mode rules), the initiating device may start the discovery procedure and broadcasts frames marking the beginning of each slot. On hearing the initial discovery slot (which also details the number of slots in the discovery process: 1, 6, 8 or 16), a device may randomly select one of the slots in which it will respond. When the device receives the frame marking its chosen slot, it transmits a discovery response frame. All frames in the discovery procedure may use the HDLC unnumbered format of type exchange identification.

In 1206, the card may attempt to authenticate the remote device via an exchange of information, such as public-private key pairs. In other embodiment, the remote device may include a JAM card and the card may be configured to validate information received from the JAM card to determine whether to allow further communications. In 1208, the card may determine whether to enable an interrogation mode.

In the interrogation mode, gaming information stored on the card may be passed to the remote device and possibly updated. Gaming information may include but is not limited to 1) account information, such as player tracking account information, credit account information or banking account information, 2) personal information, such as name, 3) gaming preference information, such as preferred games, 4) credit information, such as information that allows a record of a credit amount associated with a cashless system to be transferred to the gaming machine.

The card may not be configured to enter the interrogation mode unless one or more signals received from a photocell or a photo-detector are above a threshold value. The threshold signal values may be selected to indicate that the photocell is receiving power from a line of sight emitter, such as an emitter that emits visible light. The threshold values utilized by the card and intensity of light from the photon emitter may be selected such that the one or more signals generated from the photocell may be clearly distinguished from signals generated when the photocell is exposed to ambient lighting conditions that are typical of the environment in which the card may operate, such as within a casino environment.

In one embodiment, the card may be designed or configured such that it can not physically transfer information unless it is receiving sufficient power from the photocell. For instance, the optical communication interface and associated logic device may require a certain amount of power to operate. The photocell may be configured (e.g., the size of the photocell may be selected or the type of photocell selected where different photocell have different power generating capabilities and efficiencies as a function of wavelength) to generate only the minimal power requirements when exposed to a light source of a particular intensity value or greater. The light source may also be tuned in this manner, i.e., a wavelength or wavelengths for the light source may be selected that generate the particular threshold value.

In other embodiments, parameters of the photocell and a corresponding light source may be selected such that one or more signals generated from the photocell while receiving power from the light source are between a range of values. The one or more signals may be indicative of a power level, voltage level, current level or some other electrical property of the photocell. The card including the photocell may be configured such that interrogation of the card for gaming information is only allowed while the one or more signals are between the threshold values.

In yet another embodiment, the portable card may be configured to check to see if the one or more signals vary with a certain time depending pattern. For instance, the light source may be configured to vary its intensity as a function of time which would induce a time varying change in the electrical properties of the photocell. The card with the photocell may be configured to only allow interrogation when the electrical properties of the photocell are varying according to some excepted time varying function, which may be indicated by one or more signals generated by the photocell.

The "line of sight" refers to the requirement that the photocell on the card and the emitter need to be aligned in some manner. For instance, the photocell on the card and an emitter on a gaming machine may have to be facing one another to some extent so that the photocell on the card is activated from photons emitted by the emitter. As previously discussed, the optical communication interface may also have this requirement, i.e., emitters and receivers associated with the optical communication interfaces on each of the card and the gaming device, such as a gaming machine, gaming kiosk or gaming table may also need to be aligned in some manner, such as facing one another within some range of angles. For example, IrDA typically proscribes that devices to comply with the standard are aligned within a 15 degree cone. The present invention is not so limited and a tighter alignment standard may be used for additional security, such as within 10 degrees or within 5 degrees of alignment if desired.

In 1216, after interrogation mode has been enabled, the card may be configured to keep checking that one or more parameters are within range, such as the photocell and turn off interrogation mode in 1218 if the parameters are out of range. For IrDA, The infrared medium over which IrLAP is required to operate is a point-to-point, half-duplex medium. While the narrow cone angle of IrPHY limits the number of other devices that can be seen, there is a possibility of hidden devices. In such a situation, one device may see many other devices. However, it does not follow that those devices will see each other. This can result in collisions where transmissions from devices hidden from each other may overlap, resulting in the inability of the receiving device to decode those frames correctly. The characteristics of the infrared medium also result in there being no reliable way to detect transmission collisions. Thus, when the interrogation mode is turned on and an attempt to communicate with the card is made by an unauthorized device, this may simply result in garbled communications.

The drop in communications, such as a number of unreadable frames may be monitored by the card and in some instance trigger the card to disable the interrogation mode in 1218. A drop in communications could also occur if the card was moved such that it was no longer aligned with the optical receiver/transmitter on the gaming device which also may trigger the interrogation mode to be disabled in 1218. In another embodiment, a detection of an address conflict or an indication that more than one device is trying to communicate with the card may trigger the card to disable the interrogation mode in 1218.

In 1210, after interrogation mode is enabled, card data, such as gaming information, that is only allowed to be sent while the card is in interrogation mode may be sent. During a gaming session or after a gaming session is completed, the card may receive new card data in 1212. In one embodiment, the card may be only operable to update the memory with new gaming information, which may involve over-writing old gaming information, when the card is in interrogation mode. Some of the stored gaming information, such as credit information, may be displayed on a display device associated with the card. In 1214, the memory and display may be updated.

In some embodiments, when a bi-stable LCD is used, the card may be configured such that the display may be updated only when under power from the photonic power source during an interface with a gaming device including the photonic power source. In other embodiments, the card may include an internal power source that allows a display on the card to be update at other times. In 1220, the gaming machine or the card may disable communications which may also trigger the interrogation mode for the card to be disabled.

For IrDA, once the data exchange has taken place, the IrLAP link may be disconnected by either the primary or secondary devices. Should the primary wish to disconnect, it sends a disconnect command to the secondary device with the poll bit set. The secondary responds by returning an unnumbered acknowledge frame with the final bit set. Both devices may now be in normal disconnect mode, and the default normal disconnect mode parameters (9600 bits/s data rate) may apply. If the secondary wishes to disconnect, it may transmit a request disconnect response with the final bit set when it is polled by the primary. The primary may then respond by transmitting a disconnect command, and both devices will be in normal disconnect mode. Once the two devices are in normal disconnect mode, the medium may be free for any other device to initiate the discovery, address resolution, or connection procedures.

Figure 5:
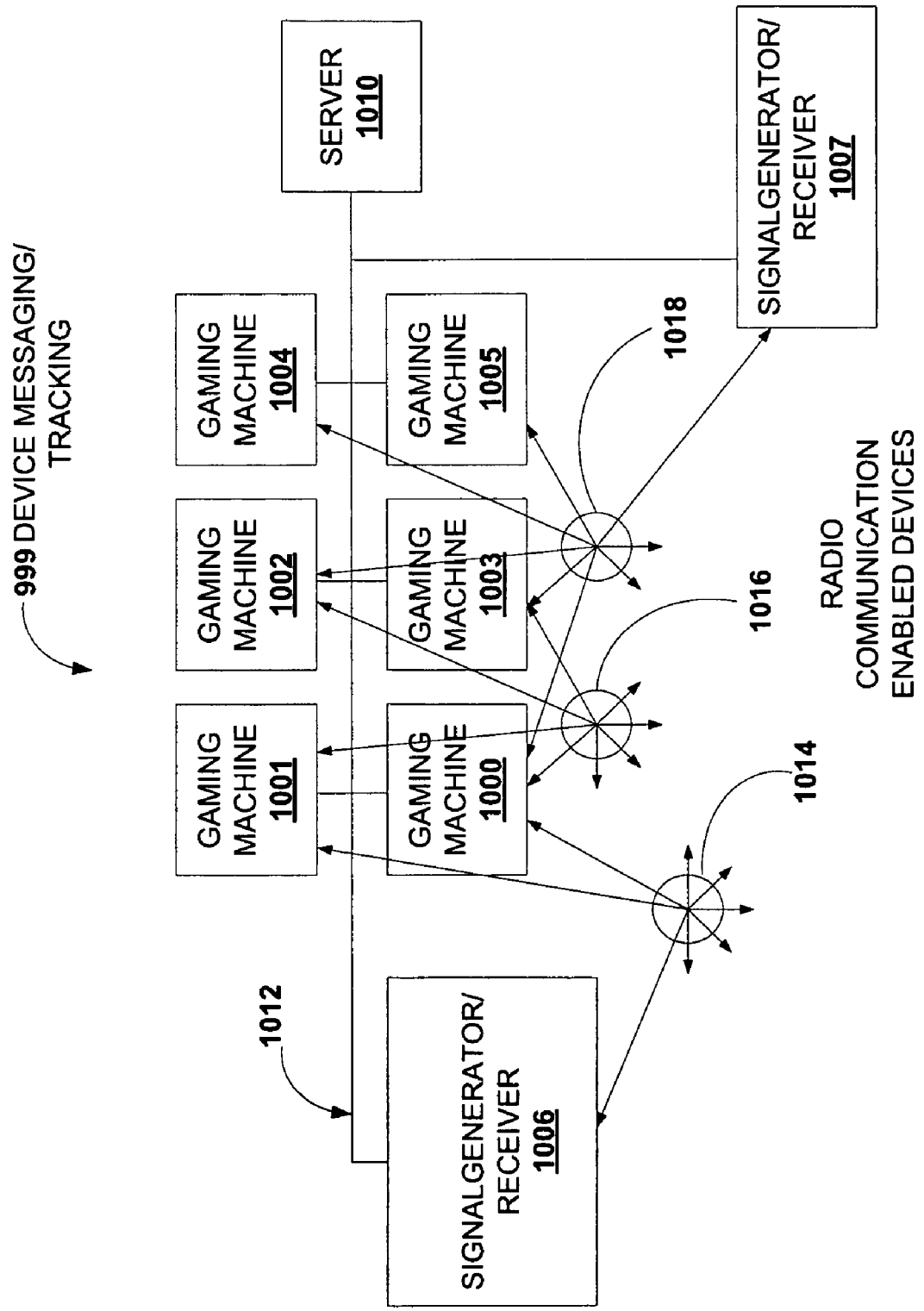
FIG. 5 is a block diagram of a gaming system operable to push messages to a photonic card in a gaming environment.

FIG. 5 is a block diagram of a gaming system 999 operable to push messages to a photonic card in a gaming environment. However, the present invention is not limited to locating wireless gaming devices used as loyalty program instruments. Any wireless gaming device capable of communication with the gaming system, such as cell phones and personal communication devices with wireless interfaces, used for any purpose may be located with the present invention.

The gaming system may comprise a plurality of wireless signal generators/receivers, such as 1006 and 1007, such as cell phones and other portable communication devices. The gaming system 999 may also include a plurality of wireless access points to a local area network 1012 for active communication sessions with the more complex radio enabled card devices that may transmit and receive data at higher data bandwidths. The wireless access points may provide sufficient bandwidth for services involving voice, video, internet connections, text messaging, e-mail and game services that may be provided on the more radio enabled devices with higher capabilities such as cell phones. The wireless signal receivers and wireless access points may also be located in gaming devices such as gaming machines 1000, 1001, 1002, 1003, 1004 and 1005. The wireless signal generators/receivers and wireless access points may be located in locations separate from the gaming machines, such as wireless signal generator/receiver 1007 and wireless access point 1006.

The wireless signal generator/receivers and wireless access points are connected via a network 1012 to a server 1010. The server 101 may be used to process signals received from a plurality of signal receivers, such as 1006 and 1007, in communication with the server 1010 and use information received from the receivers to identify various wireless sources, such as 1014, 1016 and 1018. Once the wireless sources are identified, for instance a wireless source, such as a portable card device may be registered to a particular user, the server 1010 may push messages to the wireless source. These messages may be targeted to a particular user, may be broadcast to a group of users without distinction between the users and in some embodiments, may be location based. For instance, if a wireless source is detected by an access point near a restaurant, then a message targeting a special to that restaurant could be pushed to the user.

Gaming Machine

Figure 6:
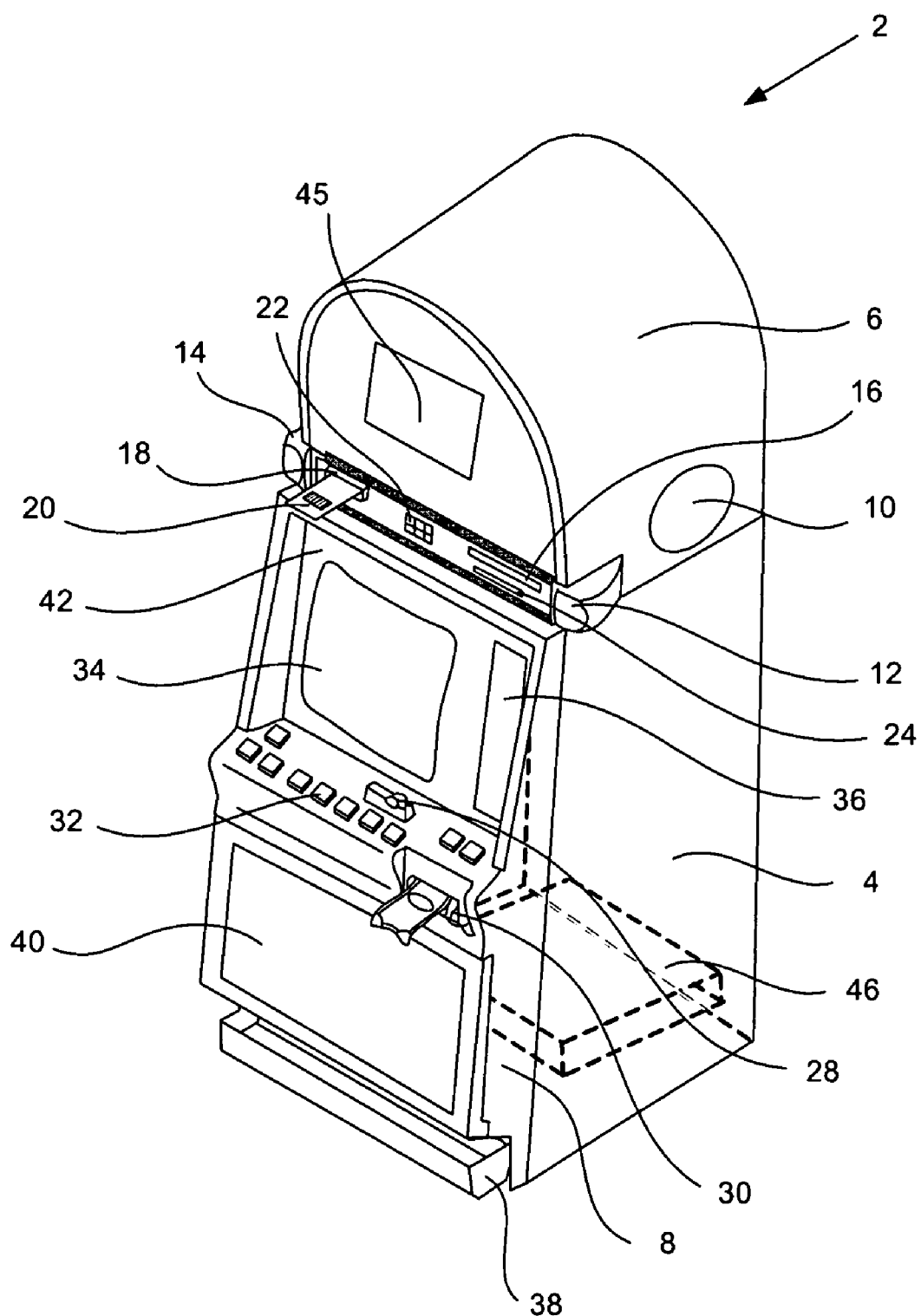
FIG. 6 illustrates a gaming machine.

As illustrated in the example of FIG. 6, machine 2 includes a main cabinet 4, which generally surrounds the machine interior and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, OLED, plasma or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2.

According to a specific embodiment, the devices may be controlled by code executed by a master gaming controller 46 housed inside the main cabinet 4 of the machine 2. The hardware and software associated with the master gaming controller 46 may be distributed throughout the cabinet 4 and is not limited to the specific location illustrated in the FIG. 6. In specific embodiments where it may be required that the code be periodically configured and/or authenticated in a secure manner, the technique of the present invention may be used for accomplishing such tasks.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

As illustrated in the example of FIG. 6, the gaming machine 2 may include a top box 6, which sits on top of the main cabinet 4. The top box 6 may house a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 9. For example, the top box may include a bonus wheel or a back-lit silk screened panel, which may be used to add bonus features to the game being played on the gaming machine or a wireless interface for communication with a patron card. As another example, the top box may include a display for a progressive jackpot offered on the gaming machine. During a game, these devices may be controlled and may be powered, in part, by circuitry (e.g. a master gaming controller) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., balance) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. Pat. No. 7,111,141, titled, "Dynamic NV-RAM," and U.S. Pat. No. 7,384,339, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS or Super-SAS are communication protocols used to transmit information, such as metering information, from a gaming machine to a remote device. Often SAS or Super-SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. In particular embodiments, a JAM (Java Access Module) card in a gaming machine may treat information received from the master gaming controller as not trusted as it may be unaware that the gaming machine includes a trusted memory device. The JAM cards may be used to authenticate the portable card devices described herein. JAM cards and associated methods may be utilized with the portable card devices described herein are described in detail in U.S. patent Application Ser. No. 11/967,916, titled, "IMPROVED METHODS AND ARCHITECTURE FOR CASHLESS SYSTEM SECURITY," by Cunningham II, et al, filed Dec. 31, 2007, which is incorporated herein in its entirety and for all purposes.

Trusted memory devices and controlling circuitry are typically designed to not allow modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. Pat. No. 7,515,718, entitled "Secured Virtual Network in a Gaming Environment", naming Nguyen et al. as inventors, filed on Mar. 10, 2005, herein incorporated in its entirety and for all purposes. This application also describes authentication and device verification methods that may be applied to the portable card devices described with respect to FIGS. 1-5.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Returning to the example of FIG. 6, when a user wishes to play the gaming machine 2, he or she inserts cash through the coin acceptor 28 or bill validator 30. Additionally, the bill validator may accept a printed ticket voucher, which may be accepted by the bill validator 30 as indicia of credit when a cashless ticketing system is used. In addition, the gaming machine may include an interface that allows a patron card or other portable device described with respect to FIGS. 1-8 to communicate with the gaming machine including a transfer of credits between the portable gaming device and the gaming machine.

At the start of the game, the player may enter playing tracking information using the card reader 24, the keypad 22, and the florescent display 16. Further, other game preferences of the player playing the game may be read from a card inserted into the card reader. In one embodiment, the card reader on the gaming machine may be configured to accept the portable card devices described with respect to FIGS. 1-5. Further, the player tracking unit may include a JAM card that allows credits to be transferred to and from the gaming machine and to and from the patron card via the player tracking unit. In particular, the player tracking unit may be operable to communicate with a cashless server.

During the game, the player may view game information using the video display 34. Other game and prize information may also be displayed in the video display screen 45 located in the top box. During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one or more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18 or information that allows food or merchandise may be transferred to a portable card device described with respect to FIGS. 1-5. When the portable card device includes a display, some indication, such as a text or a symbol may be activated on the display to indicate this information is stored on the card.

Gaming System Components

Figure 7:
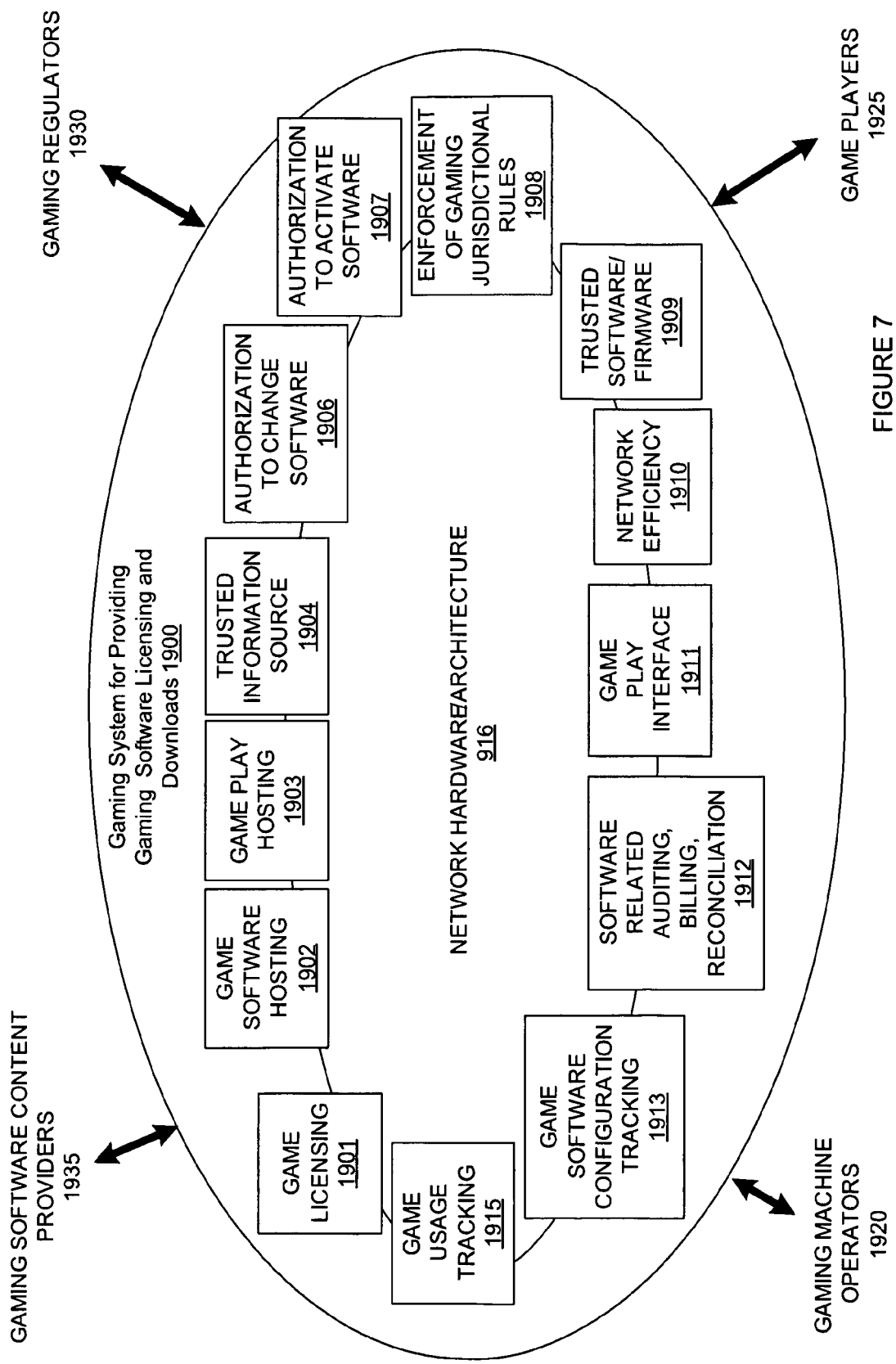
FIG. 7 illustrates a gaming system and associated components.

FIG. 7 shows a block diagram illustrating components of a gaming system 1900 which may be used for implementing various aspects of the present invention. In FIG. 7, the components of a gaming system 1900 for providing game software licensing and software downloads are described functionally. The described functions may be instantiated in hardware, firmware and/or software and executed on a suitable device. These downloads may include downloads of applets for JAM cards or patron cards and software for allowing terminals to interact with JAM cards or patron cards. In the system 1900, there may be many instances of the same function, such as multiple game play interfaces 1911. Nevertheless, in FIG. 7, only one instance of each function is shown. The functions of the components may be combined. For example, a single device may comprise the game play interface 1911 and include trusted memory devices or sources 1909. The described components and their functions may be incorporated various embodiments of the servers and devices described with respect to FIGS. 1-6.

The gaming system 1900 may receive inputs from different groups/entities and output various services and or information to these groups/entities. For example, game players 1925 primarily input cash or indicia of credit into the system, make game selections that trigger software downloads, and receive entertainment in exchange for their inputs. Game software content providers 1935 provide game software for the system and may receive compensation for the content they provide based on licensing agreements with the gaming machine operators. Gaming machine operators select game software for distribution, distribute the game software on the gaming devices in the system 1900, receive revenue for the use of their software and compensate the gaming machine operators. The gaming regulators 1930 may provide rules and regulations that must be applied to the gaming system and may receive reports and other information confirming that rules are being obeyed.

In the following paragraphs, details of each component and some of the interactions between the components are described with respect to FIG. 7. The game software license host 1901 may be a server connected to a number of remote gaming devices that provides licensing services to the remote gaming devices. For example, in other embodiments, the license host 1901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 1915 may track the usage of game software on a plurality of devices in communication with the host. The game usage-tracking host 1915 may be in communication with a plurality of game play hosts and gaming machines. From the game play hosts and gaming machines, the game usage tracking host 1915 may receive updates of an amount that each game available for play on the devices has been played and on amount that has been wagered per game. This information may be stored in a database and used for billing according to methods described in a utility based licensing agreement.

The game software host 1902 may provide game software downloads, such as downloads of game software or game firmware, to various devious in the game system 1900. For example, when the software to generate the game is not available on the game play interface 1911, the game software host 1902 may download software to generate a selected game of chance played on the game play interface. Further, the game software host 1902 may download new game content to a plurality of gaming machines via a request from a gaming machine operator.

In one embodiment, the game software host 1902 may also be a game software configuration-tracking host 1913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 1903 may be a host server connected to a plurality of remote clients that generates games of chance that are displayed on a plurality of remote game play interfaces 1911. For example, the game play host device 1903 may be a server that provides central determination for a bingo game play played on a plurality of connected game play interfaces 1911. As another example, the game play host device 1903 may generate games of chance, such as slot games or video card games, for display on a remote client. A game player using the remote client may be able to select from a number of games that are provided on the client by the host device 1903. The game play host device 1903 may receive game software management services, such as receiving downloads of new game software, from the game software host 1902 and may receive game software licensing services, such as the granting or renewing of software licenses for software executed on the device 1903, from the game license host 1901.

In particular embodiments, the game play interfaces or other gaming devices in the gaming system 1900 may be portable devices, such as electronic tokens, cell phones, smart cards, tablet PC's and PDA's. The portable devices may support wireless communications and thus, may be referred to as wireless mobile devices. The network hardware architecture 1916 may be enabled to support communications between wireless mobile devices and other gaming devices in gaming system. In one embodiment, the wireless mobile devices may be used to play games of chance.

The gaming system 1900 may use a number of trusted information sources, such as the HSM previously described. Trusted information sources 1904 may be devices, such as servers, that provide information used to authenticate/activate other pieces of information. CRC values used to authenticate software, license tokens used to allow the use of software or product activation codes used to activate to software are examples of trusted information that might be provided from a trusted information source 1904. Trusted information sources may be a memory device, such as an EPROM, that includes trusted information used to authenticate other information. For example, a game play interface 1911 may store a private encryption key in a trusted memory device that is used in a private key-public key encryption scheme to authenticate information from another gaming device.

When a trusted information source 1904 is in communication with a remote device via a network, the remote device will employ a verification scheme to verify the identity of the trusted information source. For example, the trusted information source and the remote device may exchange information using public and private encryption keys to verify each other's identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 1900 of the present invention may include devices 1906 that provide authorization to download software from a first device to a second device and devices

1907 that provide activation codes or information that allow downloaded software to be activated. The devices, 1906 and 1907, may be remote servers and may also be trusted information sources. One example of a method of providing product activation codes that may be used with the present invention is describes in previously incorporated U.S. Pat. No. 6,264,561.

A device 1906 that monitors a plurality of gaming devices to determine adherence of the devices to gaming jurisdictional rules 1908 may be included in the system 1900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 1900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 1916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 1910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 1912. For example, a software licensing billing server may generate a bill for a gaming device operator based upon a usage of games over a time period on the gaming devices owned by the operator. In another example, a software auditing server may provide reports on game software downloads to various gaming devices in the gaming system 1900 and current configurations of the game software on these gaming devices.

At particular time intervals, the software auditing server 1912 may also request software configurations from a number of gaming devices in the gaming system. The server may then reconcile the software configuration on each gaming device. In one embodiment, the software auditing server 1912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 7. Many of the interactions are coupled. For example, methods used for game licensing may affect methods used for game downloading and vice versa. For the purposes of explanation, details of a few possible interactions between the components of the system 1900 relating to software licensing and software downloads have been described. The descriptions are selected to illustrate particular interactions in the game system 1900. These descriptions are provided for the purposes of explanation only and are not intended to limit the scope of the present invention.

Figure 8:
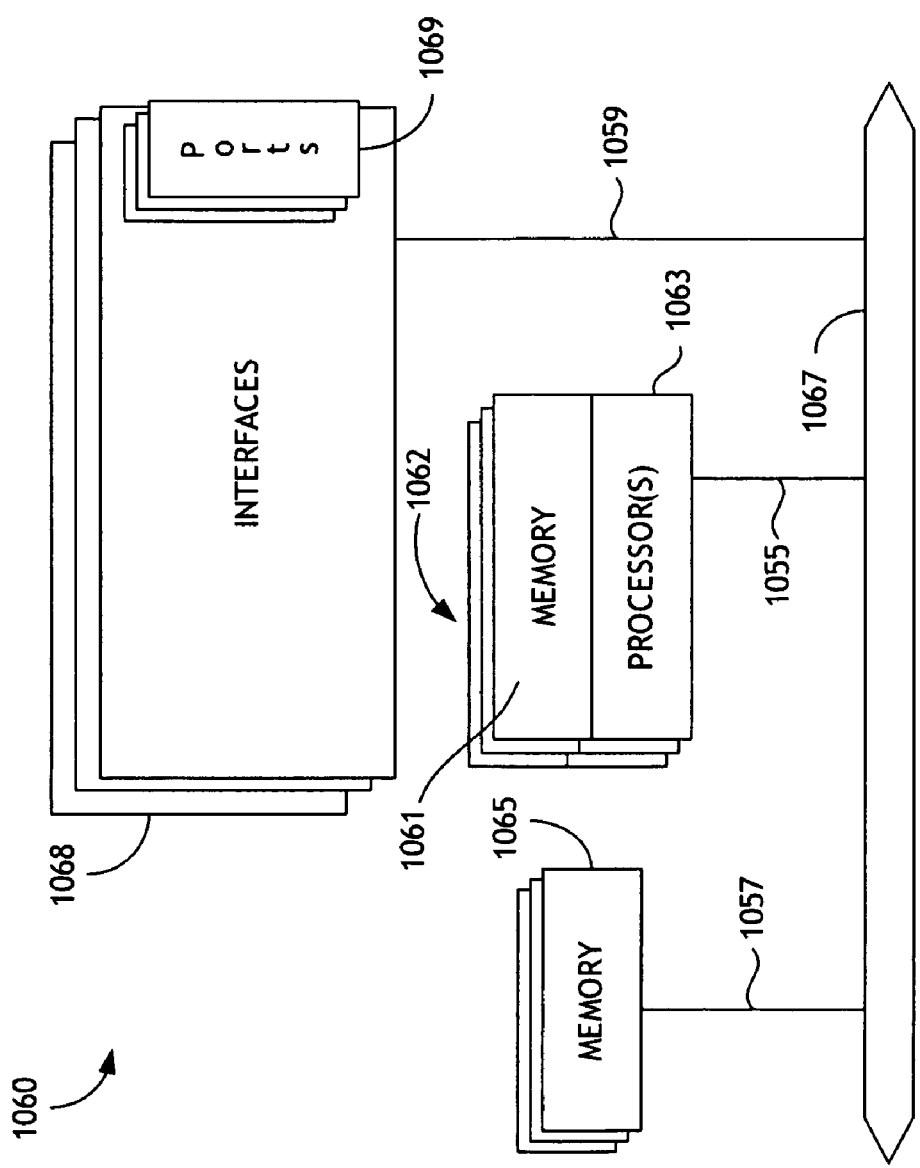
FIG. 8 illustrates components of a server.

FIG. 8 illustrates an example of a network device that may be configured for implementing some methods of the present invention, such as methods associated with pushing messages to a portable card device. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1068 control such communications-intensive tasks as encryption, decryption, compression, decompression, packetization, media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "linecards"). Generally, interfaces 1068 control the sending and receiving of data packets over the network and sometimes support other peripherals used with the network device 1060. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 8) or switch fabric based (such as a cross-bar).

Figure 9:
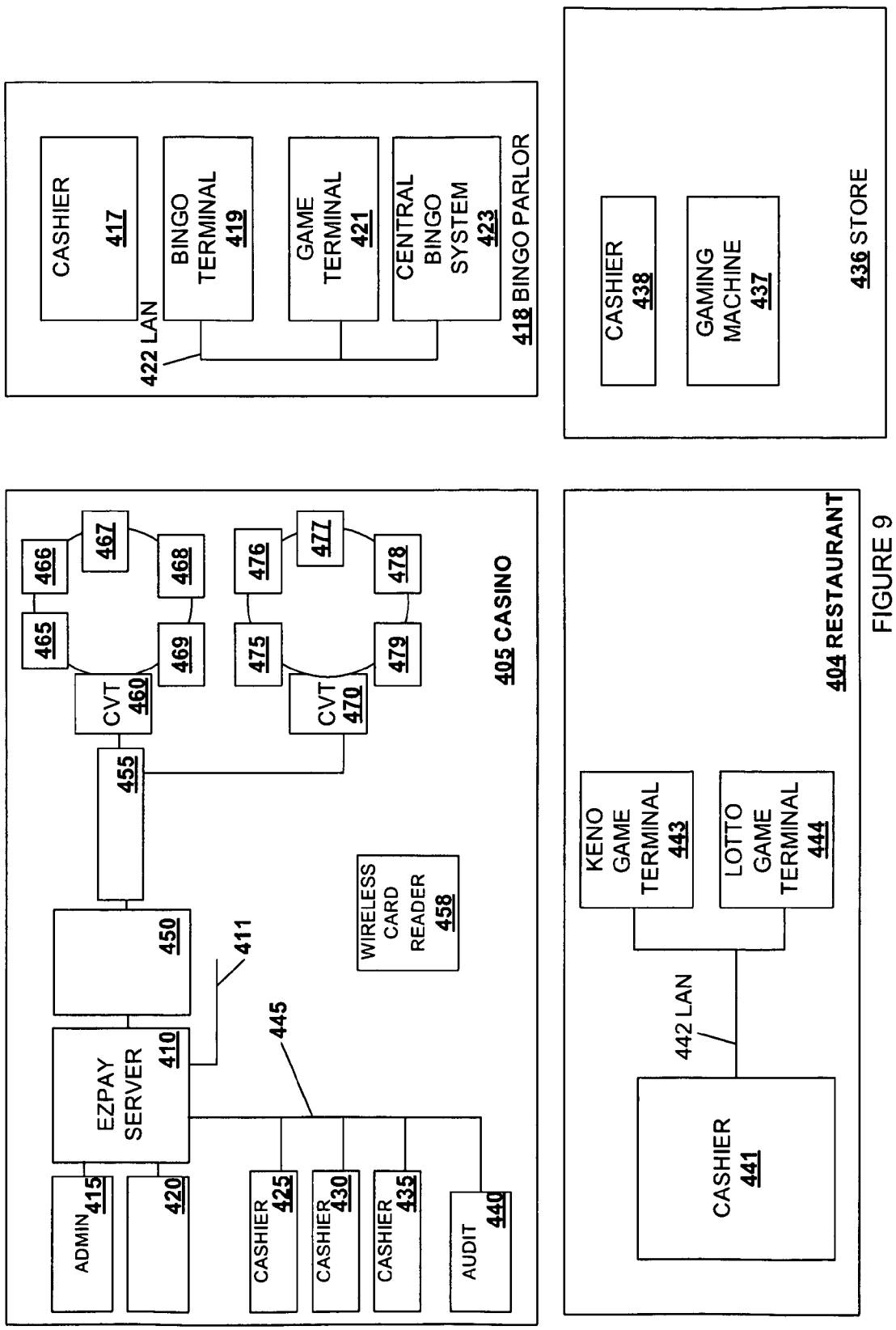
FIG. 9 illustrates gaming system including a cashless server.

FIG. 9 is a block diagram containing a plurality of gaming venues including a casino 405, a restaurant 404, a bingo parlor 418 and a store 436 where a portable card device may be utilized for one embodiment of the present invention. In one embodiment, the portable card device may be used with a cashless system such as an EZ pay™ ticket voucher system. A cashless system is the hardware components and software components needed to generate and validate cashless instruments. In FIG. 9, one embodiment of the components of a cashless system that may be used with a portable card device is shown within the casino 405. Further details are described with respect to U.S. Pat. No. 6,852,031, by Rowe, and titled, "EZ pay™ smart card and ticket system," which is incorporated herein by reference in its entirety and for all purposes. In this patent, examples of applications that may be incorporated as programming for a logic device of the portable card devices as described herein are also discussed.

Components of a cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ pay™ ticket voucher system. Typically, a cashless system is installed at each property utilizing cashless instruments. To allow multi-site validations of cashless instruments, the cashless systems at each property may be linked to a cashless instrument transaction clearinghouse.

Returning to FIG. 9, a first group of gaming machines, 465, 466, 467, 468, and 469 is shown connected to a first clerk validation terminal (CVT) 460 and a second group of gaming machines, 475, 476, 477, 478 and 479 is shown connected to a second CVT 470. All of the gaming machines print ticket vouchers which may be exchanged for cash or accepted as credit of indicia in other gaming machine located within the property 405. In this example, the ticket voucher serves as a cashless instrument. In addition, the gaming machines may contain smart card readers for reading voucher information stored on smart cards. As described above, vouchers stored on the smart card may be used for game play on the gaming machines.

The CVTs, 460 and 470, store cashless instrument transaction information corresponding to the outstanding cashless instrument, including ticket vouchers, smart cards and debit cards, that are waiting for redemption. In addition, cashless instrument transaction information may be stored in a cashless server including the EZ pay server 410. The cashless instrument transaction information may be used when the vouchers are validated and cashed out or redeemed in some manner. The CVTs 460 and 470 may store the information for the ticket vouchers printed by the gaming machines connected to the CVT. In addition, the CVTs 460 and 470 may store the information for vouchers stored on a smart card that were generated on each gaming machine. For example, CVT 460 stores voucher information for vouchers issued by gaming machines 465, 466, 467, 468, and 469. In addition, the CVTs may store security information, as described above for the smart cards. The security information may be used to validate a digital signature generated by the smart card or to cancel a card.

In this embodiment, when a player wishes to cash out a voucher, the player may redeem vouchers issued from a particular gaming machine at the CVT associated with the gaming machine or any other CVT which is part of the cashless system associated with the CVT. For example, since CVT 460 and CVT 470 are connected as part of a single cashless system to the EZ pay server 410, a player may redeem vouchers or utilize vouchers at the gaming machines, the CVT's (460 or 470), the cashiers (425, 430, 435, and 440) or the wireless cashiers 458. The CVTs, cashiers, wireless cashiers and gaming machines may be referred to as "cashless validation sites."

To cash out a voucher stored on a portable card device, the portable card device may be utilized with an embodiment of a card acceptor mechanism described with respect to FIGS. 2A or 2B, at the cashless validation site and the authenticity of the portable card device may be determined. For an authenticated portable card device storing one or more vouchers, one of the vouchers is validated by comparing information obtained from the voucher with information stored within the CVT. After a ticket voucher has been cashed out, the CVT marks the voucher paid in a database to prevent a voucher with similar information from being cashed multiple times.

In this embodiment using the cashless system, multiple groups of gaming machines connected to CVTs are connected together in a cross validation network 445. The cross validation network is typically comprised of one or more concentrators 455 which accepts inputs from two or more CVTs and enables communications to and from the two or more CVTs using one communication line. The concentrator is connected to a front end controller 450 which may poll the CVTs for voucher information. The front end controller may be connected to a cashless system server 410 which may provide a variety of information services for the cashless system including accounting 420, administration 415, as well as portable card device security.

A single hardware and software platform allowing cashless instruments to be utilized at all of the cashless validation sites (e.g. cashier stations, gaming machines, wireless cashiers and CVTs) within a single property or across multiple properties may be referred to as a "cashless server". Usually, the cashless server is a communication nexus in the cross validation network. For instance, the cashless server 410 may be connected to the cashiers, wireless devices, CVTs, the gaming machines and gaming tables (not shown) via the CVTs. Since the cashless server 410 is connected to the devices utilizing portable card devices, it may be used to implement security features such as clearing the use of a portable card device after it has entered a fail-safe or canceling a portable card device.

The cross validation network allows vouchers issued by any gaming machine connected to the cross validation to be accepted by other gaming machines in the cross validation network 445. Additionally, the cross validation network allows a cashier at a cashier station 425, 430, and 435 to validate any voucher generated from a gaming machine within the cross validation network 445. To cash out a voucher, a player may present a smart card storing one or more vouchers at one of the cashier stations 425, 430, and 435 or to a game service representative carrying a wireless gaming device for validating ticket vouchers. A more complete discussion of the details of the wireless gaming device 458, including hardware and utilization, are described in copending U.S. patent application Ser. No. 09/544,844 entitled a WIRELESS GAME ENVIRONMENT filed Apr. 7, 2000 by Rowe, now U.S. Pat. No. 6,682,421, which is incorporated herein by reference in its entirety and for all purposes. Information obtained from the voucher may be used to validate the voucher by comparing information on the ticket with information stored on one of the CVTs connected to the cross validation network or with information stored in the cashless server 410.

As vouchers stored on smart cards are validated, this information may be sent to audit services computer 440 providing audit services, the accounting computer 420 providing accounting services or the administration computer 415 providing administration services. In another embodiment, all of these services may be provided by the cashless server including the cashless server 410. Examples of auditing services, which may be provided by cashless system software residing on the auditing computer 440 include 1) session reconciliation reports, 2) soft count reports, 3) soft count verification reports, 4) soft count exception reports, 5) machine voucher status reports and 5) security access report. Examples of accounting services, which may be provided by cashless system software residing on the accounting computer 420 include 1) voucher issuance reports, 2) voucher liability reports, expired voucher reports, 3) expired voucher paid reports and 4) voucher redemption reports. Examples of administration services, which may be provided by cashless system software residing on the administration computer 415 include 1) manual voucher receipt, 2) manual voucher report, 3) voucher validation report, 4) interim validation report, 5) validation window closer report, 6) voided voucher receipt and 7) voided voucher report.

A portable card device used at the casino 405 may also be used at other venues. For instance, after storing one or more cashless vouchers on a portable card device, a player may take the smart card to the bingo parlor 418. At the bingo parlor 418, a player may utilize the smart card at the bingo terminal 419 and game terminal 421 which may be connected to a LAN 422 to a central gaming system 423. At the cashier 417, electronic bingo cards may be downloaded to the smart card from the central electronic bingo system 423 and issued to the player. The player then may insert the smart card into the stationary player such as the bingo terminal 419, handheld player, or other applicable game play devices and may load the bingo cards from the smart card for use in a bingo game. As the bingo games are played, the smart card is updated and the player may receive player points for game play or cash/vouchers for game wins. Player tracking information and voucher information may be stored on the smart card and communicated back to the central bingo system 423. The player can reload the portable card device with additional bingo cards as needed. In addition, when the player does not already have a portable card device, the player may sign up for a portable card device where the bingo cards are purchased (e.g. cashier 417).

Using the portable card, device a player may also have one or more bingo progressive jackpots being played for which are tracked and managed on the smart card. This would allow a player to build the value of their own bingo progressive, which they are playing to win based upon bingo game play. As bingo game play continues, the value of the bingo progressive prize they are playing for increases. When a specific trigger occurs, such as a certain bingo card combination, the bingo progressive prize may be won and credited to the player account.

In the bingo parlor 418, a player may play other games besides bingo at the game terminal 421. For instance, a customer may wish to purchase a predefined set of electronic pull-tabs. In an electronic pull-tab, a player may reveal covered symbols in columns and rows displayed in the pull-tab game. The symbols that are revealed allow the player to determine whether an award was obtained. The pull-tabs may be purchased at the cashier 417 and may be placed on the portable card device to be played in one of the electronic player devices which allows the user to play the pull-tab game such as the game terminal 421. All player points associated with the pull-tab purchases and the results of the pull-tab game play may be collected and stored on the portable card device. All pull-tab wins may also be stored on the portable card device and may be redeemable at a redemption center. The pull-tab game play and bingo game play using the portable card device is not limited to the bingo parlor and may be extended to other venues such casinos, stores and restaurants. In addition, other electronic games, as approved by a given gaming jurisdiction may be used with the portable card device. These venues and their associated gaming devices may include interfaces that are compatible with the line-of-sight communication interfaces and/or photonic power sources described with respect to FIGS. 1-6.

After playing at the casino 405 and the bingo parlor 418, a player may enter the restaurant 404 and play a keno game or a lotto game. The player may purchase keno game plays and lotto game plays from a cashier terminal 441 connected to the keno game terminal 443 and lotto game terminal 444 by a LAN 442. The keno game plays and lotto game plays may be downloaded to the player's portable card device. At the keno game terminal 443 and at the lotto game terminals 444 located at a table where the player may be eating, the player may use their portable card device at the terminals to play the lotto games and keno games stored on the card. Within a keno or lotto environment a certain set of numbers are drawn with the player attempting to match those numbers, the portable card device may contain sets of lucky numbers and associated game types the player wishes to use each time the player plays. In this manner, the player need only establish the set of numbers one time. Further, as described above, the portable card device may execute applications allowing the player to store cash vouchers awarded from keno game play or lotto game play and accumulate loyalty points on the smart card from keno game play and lotto game play.

After using the portable card device at the casino 405, the bingo parlor 418, the restaurant 404, the play may go to the store with their portable card device. At the store 436, the player may purchase gift items at the cashier 438 and engage in game play at the gaming machine 437. Using the portable card device, the player may accumulate loyalty points based on their purchases and game play. In addition, the player may use vouchers stored on the portable card device for game play or purchases. In another example, the player may win a progressive jackpot on the gaming machine 437 based upon progressive game information stored on the portable card device from game play at one or more venues.

Although the foregoing present invention has been described in detail by way of illustration and example for purposes of clarity and understanding, it will be recognized that the above described present invention may be embodied in numerous other specific variations and embodiments without departing from the spirit or essential characteristics of the present invention. Certain changes and modifications may be practiced, and it is understood that the present invention is not to be limited by the foregoing details, but rather is to be defined by the scope of the appended claims.

The invention is claimed as follows:

1. A gaming machine comprising:
a cabinet;
a master gaming controller, enclosed within said cabinet, designed or configured to:
  a) control a wager-based game played on the gaming machine;
  b) control a photonic power source configured to provide power to a photonic-powered card coupled to the gaming machine, wherein to provide power to the photonic-powered card, the master gaming controller is configured to provide power to a photovoltaic cell of the photonic-powered card in a directional manner;
  c) communicate with the photonic-powered card via an optical communication interface using an optical communication protocol, wherein:
    to communicate with the photonic-powered card, the master gaming controller is configured to communicate bi-directionally with a logic device of the photonic-powered card; and
    to communicate bi-directionally with the logic device, the master gaming controller is configured to provide at least enough power to the photovoltaic cell to exceed a threshold level of power of the photovoltaic cell to cause the logic device to begin the bi-directional communication with the master gaming controller to transmit and receive gaming information;
  d) communicate with one or more remote servers via a network interface;
a display device, coupled to the cabinet, configured to display the wager-based game;
an acceptor mechanism, coupled to an outer surface of the cabinet, configured to receive the photonic-powered card in a position that allows the photonic card to:
  1) receive photons emitted from the photonic power source; and
  2) communicate with the master gaming controller via the optical communication interface;
wherein:
  the photonic power source is located within an interior portion of the cabinet aligned with the acceptor mechanism;
  the optical communication interface is coupled to the master gaming controller and aligned with the acceptor mechanism; and
  the network interface is coupled to the master gaming controller;
an input mechanism, coupled to the cabinet, for receiving cash or an indicia of credit for making wagers on the wager-based game; and
an output mechanism, coupled to the cabinet, for outputting cash or an indicia of credit.

2. A gaming machine comprising:
a cabinet;
a master gaming controller, enclosed within said cabinet, designed or configured to:
  a) control a wager-based game played on the gaming machine;
  b) control a photonic power source configured to provide power to a photonic-powered card;
  c) communicate with the photonic-powered card via an optical communication interface using an optical communication protocol; and d) communicate with one or more remote servers via a network interface;

a display device, coupled to the cabinet, configured to display the wager-based game;

an acceptor mechanism, coupled to an outer surface of the cabinet, configured to receive the photonic-powered card in a position that allows the photonic card to:
1) receive photons emitted from the photonic power source; and
2) communicate with the master gaming controller via the optical communication interface;
wherein:
the photonic power source is located within an interior portion of the cabinet aligned with the acceptor mechanism;
the photonic power source is configured to emit light through an aperture in an outer surface of the interior portion of the cabinet;
the optical communication interface is coupled to the master gaming controller and aligned with the acceptor mechanism; and
the network interface is coupled to the master gaming controller;

an input mechanism, coupled to the cabinet, for receiving cash or an indicia of credit for making wagers on the wager-based game; and an output mechanism, coupled to the cabinet, for outputting cash or an indicia of credit.

3. A gaming system comprising:
a gaming machine comprising:
a cabinet;
a master gaming controller, enclosed within said cabinet, designed or configured to:
a) control a wager-based game played on the gaming machine;
b) control a photonic power source configured to provide power to a photonic-powered card;
c) communicate with the photonic-powered card via a first optical communication interface using an optical communication protocol; and
d) communicate with one or more remote servers via a network interface;

a display device, coupled to the cabinet, configured to display the wager-based game;

an acceptor mechanism, coupled to an outer surface of the cabinet, configured to receive the photonic-powered card in a position that allows the photonic card to:
1) receive photons emitted from the photonic power source; and
2) communicate with the master gaming controller via the optical communication interface;
wherein:
the photonic power source is located within an interior portion of the cabinet aligned with the acceptor mechanism;
the first optical communication interface is coupled to the master gaming controller and aligned with the acceptor mechanism; and
the network interface is coupled to the master gaming controller;

an input mechanism, coupled to the cabinet, for receiving cash or an indicia of credit for making wagers on the wager-based game; and an output mechanism, coupled to the cabinet, for outputting cash or an indicia of credit; and wherein the photonic-powered card comprises:
a photovoltaic cell;
a second optical communication interface compatible with the first communication interface;
a memory for storing at least gaming information; and
a logic device, coupled to the photovoltaic cell, the second optical communication interface, and the memory, the logic device being designed or configured to:
1) perform bi-directional communications using the optical communication protocol via the second optical communication interface;
2) detect a power level generated by the photovoltaic cell; and
3) determine whether the power level of the photovoltaic cell is above a threshold value and to transmit the gaming information via the second optical communication interface only when the power level of the photovoltaic cell is above the threshold value.

4. The gaming machine of claim 1, wherein dimensions of the photonic-powered card conform to the ISO 7810 international standard for identification cards.

5. The gaming machine of claim 1, wherein dimensions of the photonic-powered card conform to the ISO 7813 international standard for identification cards.

6. The gaming machine of claim 1, wherein the photonic power source is configured to emit light that activates a photovoltaic cell coupled to the photonic-powered card.

7. The gaming machine of claim 1, wherein the optical communication interface is an IrDA (Infrared Data Association) compatible interface.

8. The gaming machine of claim 1, wherein the optical communication protocol is an IrDA compatible communication protocol.

9. The gaming machine of claim 1, wherein the master gaming controller is further designed or configured to communicate with the photonic-powered card via an IrFM (Infrared Financial Messaging) compatible communication protocol.

10. The gaming machine of claim 1, further comprising a status indicator mechanism configured to indicate successful communications between the master gaming controller and the photonic-powered card via the optical communication interface.

11. The gaming machine of claim 1, wherein the photonic power source comprises one or more LEDs.

12. The gaming machine of claim 6, wherein the photonic power source is configured to emit light at one or more infrared wavelengths.

13. The gaming machine of claim 6, wherein the photonic power source is configured to emit light at one or more visible wavelengths.

14. The gaming machine of claim 7, further comprising an IrDA to USB (Universal Serial Bus) interface, the interface comprising a USB connector and the IrDA compatible interface.

15. The gaming machine of claim 2, further comprising a sensor located proximate to said aperture wherein the sensor is used to determine whether the aperture is covered by an object.

16. The gaming machine of claim 2, wherein the master gaming controller is configured to activate the photonic power source to emit light only when it is determined that the aperture is covered by an object.

17. The gaming machine of claim 2, wherein the master gaming controller is configured to enable the optical communication interface for communications only when it is determined that the aperture is covered by an object.

18. The gaming machine of claim 2, wherein after the photonic power source is activated to emit light, the master gaming controller is further designed or configured to deactivate the photonic power source when it is determined that the aperture is only partially covered or not covered by an object.

19. The gaming machine of claim 2, wherein the optical communication interface is located in the interior of the gaming machine and configured to emit communication signals via said aperture.

20. The gaming system of claim 3, wherein the photovoltaic cell is configured to generate electrical power in response to receiving photons in primarily an infrared wavelength range, a visible wavelength range, or combinations thereof.

21. The gaming system of claim 3 wherein the logic device is further designed or configured, to enable changes to the gaming information stored in the memory only when the power level of the photovoltaic cell is above a threshold value.

22. The gaming system of claim 3, wherein the photovoltaic cell is configured to provide power to the logic device.

23. The gaming system of claim 3, wherein the logic device is further designed or configured to generate a one-time pin.

24. The gaming system of claim 3, wherein the photonic-powered card includes a front side and a back side and wherein the photovoltaic cell and a receiving/transmitting portion of the second optical communication interface are both located on either the front side or the back side.

25. The gaming system of claim 3, wherein the photonic-powered card further comprises a display.

26. The gaming system of claim 3, further comprising an omni-directional wireless communication interface wherein the photonic-powered card is further configured to receive messages only via the omni-directional wireless communication interface.

27. The gaming system of claim 3, where the photonic-powered card further comprises one or more input mechanisms.

28. The gaming system of claim 23, further comprising a display configured to display the one-time pin.

29. The gaming system of claim 25, wherein the logic device is further designed or configured to display a portion of the gaming information on the display.

30. The gaming system of claim 25, wherein the display includes a bi-stable liquid crystal display (LCD).

31. The gaming system of claim 25, wherein the display is a touch screen display.

32. The gaming system of claim 25, wherein the master gaming controller is further designed or configured to generate a configuration interface for the display on a video display device coupled to the cabinet wherein the configuration interface is designed or configured to allow a selection of one or more components of the gaming information to be made and formatted for output on the display of the photonic-powered card.

33. The gaming system of claim 26, wherein the photonic-powered card further comprises a display and is configured to output a message received via the omni-directional wireless communication interface to the display.

* * * * *